United States Patent
Topfer et al.

(10) Patent No.: US 7,715,050 B2
(45) Date of Patent: May 11, 2010

(54) TONESCALES FOR GEOGRAPHICALLY LOCALIZED DIGITAL RENDITION OF PEOPLE

(75) Inventors: Karin Topfer, Rochester, NY (US); Thomas B. Brust, Webster, NY (US); Brent Keller, Rochester, NY (US); Elaine W. Jin, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 221 days.

(21) Appl. No.: 12/062,873

(22) Filed: Apr. 4, 2008

(65) Prior Publication Data
US 2008/0186520 A1 Aug. 7, 2008

Related U.S. Application Data

(63) Continuation of application No. 10/899,756, filed on Jul. 27, 2004, now Pat. No. 7,372,597.

(51) Int. Cl.
*H04N 1/60* (2006.01)
*H04N 1/407* (2006.01)

(52) U.S. Cl. ............ 358/1.9; 358/3.24; 358/3.27; 358/516; 358/518; 358/521; 358/527; 348/231.3

(58) Field of Classification Search .......... 358/1.9, 358/2.1, 3.21, 3.23, 3.24, 3.26, 3.27, 501, 358/504, 516, 518–521, 527, 530; 382/162, 382/167; 345/589–591; 348/222.1, 223.1, 348/231.99, 231.3, 231.5, 231.6, 231.7, 231.9; 396/297, 299, 300, 310, 311, 319, 429
See application file for complete search history.

(56) References Cited

U.S. PATENT DOCUMENTS 5,300,381 A  4/1994  Buhr et al.

(Continued)

FOREIGN PATENT DOCUMENTS

EP  1 139 653 A2  10/2001

(Continued)

OTHER PUBLICATIONS

D.L. MacAdam, Proc. I.R.E., 42, 1954, 166; R.W.G. Hunt, I.T. Pitt, L.M. Winter, "The Preferred Reproduction of Blue Sky, Green Grass and Caucasian Skin in Colour Photography", J. Photographic Science 22, 144, 1974.

(Continued)

*Primary Examiner*—Scott A Rogers
(74) *Attorney, Agent, or Firm*—Robert L. Walker

(57) ABSTRACT

In a method and system for processing a photographic image having lightness values, L*, representing one of the colorimetric values of an original scene, the photographic image is transformed. The transformed image has a gamma as a function of CIE 1976 L*, which includes a dark region having a rising slope, a light region having a falling slope, and a plateau region having a slope constantly within 5 percent of a maximum value in said plateau region. The rising slope is at least twice as large as the absolute value of the falling slope. The plateau region is between 10 L* and 30 L* wide. Gamma is a derivative of visually perceived reproduced CIE 1976 L* versus scene CIE 1976 L*. Gamma has a maximum slope between 1.5 and 2.0.

12 Claims, 17 Drawing Sheets

U.S. PATENT DOCUMENTS

| | | | |
|---|---|---|---|
| 5,390,036 A | | 2/1995 | Buhr et al. |
| 5,528,339 A | | 6/1996 | Buhr et al. |
| 6,160,964 A | * | 12/2000 | Imoto .................. 396/300 |
| 6,285,798 B1 | | 9/2001 | Lee |
| 6,396,599 B1 | | 5/2002 | Patton et al. |
| 6,574,373 B1 | | 6/2003 | Morba et al. |
| 6,594,388 B1 | | 7/2003 | Gindele et al. |
| 6,633,410 B1 | | 10/2003 | Narushima |
| 6,904,160 B2 | * | 6/2005 | Burgess .................. 382/113 |
| 7,133,155 B2 | * | 11/2006 | Patton et al. ............... 358/1.9 |
| 7,187,412 B1 | * | 3/2007 | Silverstein ............ 348/333.01 |
| 7,312,896 B2 | * | 12/2007 | Shibahara et al. .......... 358/1.9 |
| 2003/0035578 A1 | | 2/2003 | Dupin et al. |
| 2003/0202194 A1 | | 10/2003 | Torigoe et al. |
| 2003/0223622 A1 | | 12/2003 | Simon et al. |
| 2004/0041819 A1 | | 3/2004 | Barry et al. |

FOREIGN PATENT DOCUMENTS

| | | |
|---|---|---|
| EP | 1 205 878 A2 | 5/2002 |
| EP | 1 093 088 B1 | 3/2004 |

OTHER PUBLICATIONS

M. Yamamoto, Y-H Lim, X. Wei, M. Inui, H. Kobayashi, "On the Preferred Flesh Colour in Japan, China, and South Korea", The Imaging Science Journal, 51, 163, 2003.

Dr. R.W.G. Hunt, Fountain Press, England, Fourth Edition, "The Reproduction of Colour", p. 54.

Yamamoto and Karin Topfer, R.E. Cookingham, "The Quantitative Aspects of Color Rendering for Memory Colors", Proceedings of IS&T's 2000 PICS Conference, Portland, Oregon, USA, p. 94.

E. Goll et al., "Modern Exposure Determination for Customizing Photofinishing Printer Response", Journal of Applied Photographic Engineering, 2, 93 (1979).

K. E. Spaulding G.J. Woolfe, and E.J. Giorgianni, "Reference Input/Output Medium Metric RGB Color Encodings (RIMM/ROMM RGB)", Proc. PICS 2000, pp. 155-163 (2000)).

Chapter 20 of the Handbook of Image Quality, "Preference in Color and Tone Reproduction", Karin Topfer—"Handbook of Image Quality", B.W. Keelan, Marcel Dekker, 2002.

* cited by examiner

TONESCALES FOR GEOGRAPHICALLY LOCALIZED DIGITAL RENDITION OF PEOPLE

CROSS-REFERENCE TO RELATED APPLICATIONS

This is a continuation of application Ser. No. 10/899,756, filed Jul. 27, 2004 now U.S. Pat. No. 7,372,597.

FIELD OF THE INVENTION

The invention relates to digital image processing and enhancement and more particularly relates to methods and apparatus directed to tonescales for geographically localized digital rendition of people.

BACKGROUND OF THE INVENTION

It has long been recognized that the rendition of people is one of the most important aspects of color rendition. Consequently, a significant amount of research has been done in the field of the optimum color and tone reproduction of skin tones (D. L. MacAdam, Proc. I. R. E., 42, 1954, 166; R. W. G, Hunt, I. T. Pitt, L. M. Winter, "The Preferred Reproduction of Blue Sky, Green Grass and Caucasian Skin in Colour Photography", J. Photogr. Science 22, 144, 1974; M. Yamamoto, Y-H Lim, X. Wei, M. Inui, H. Kobayashi, "On the Preferred Flesh Colour in Japan, China and South Korea", The Imaging Science Journal, 51, 163, 2003). This literature indicates that preferences for the rendition of skin tones may differ by geographic region, ethnic and cultural background and skin type. (Also see the discussion of light and dark skin tones in U.S. Pat. No. 6,396,599 B1, to Patton et. al., entitled "Method and Apparatus for Modifying Portions of an Image in Accordance with Colorimetric Parameters (hereafter "Patton").

Traditionally preferences were addressed by offering different films and sometimes different photographic papers for different geographic markets. Examples are Kodak Professional Portra films and Kodak Ultima 100, a professional film marketed in India. With the advent of digital capture and digital photofinishing it has become possible to address these preferences by customizing a suitable set of image processing parameters.

U.S. Pat. No. 5,300,381, to Keelan et. al., entitled "Customizing a Digital Camera based on Demographic Factors" describes a digital camera customized for skin color and redeye based on demographic factors. Regional customization can be implemented at camera manufacturing, as part of the camera firmware, or by providing different camera menus by region. Regional optimization of skin tone reproduction is performed using region-specific matrix coefficients to convert camera RGB values to Standard CCIR 709 primaries.

U.S. Published Patent Application 2003/0202194 A1, filed by Torigoe, entitled "Image Processing Apparatus and Information Processing Apparatus, and Method Therefore", (hereafter "Torigoe") addresses geographic preferences in relation to digital mini labs. Torigoe describes a color managed photofinishing system with multiple input and output devices, referred to as a color conversion apparatus. A storage unit contains output profiles for multiple geographic regions. Two different methods of implementing regional preferences are disclosed. In the first case, the operator accesses a user interface, which displays a triangle with 3 different names of regions, for example, America, Europe, and Asia. A preference anywhere inside the triangle can be selected, and the system will generate the appropriate output by blending the stored regional output profiles. The second method of customizing the output is to select preferences for the reproduction of important memory colors, for example, skin, sky, and foliage, and neutral colors. The user interface has a slider that lets the user select the degree of modification between the standard rendition and the preferred rendition. Color and tone manipulations include selective hue rotations and saturation adjustments of skin tones and brightness and color balance adjustments by region. Torigoe focuses on selective manipulations of the color and brightness of skin tones without special considerations regarding overall tone reproduction or smoothness of skin tone reproduction.

U.S. Pat. No. 6,633,410 B1, to Narushima, entitled "Printer for Printing Visually Equivalent Images Relative to Displayed Images" (hereafter "Narushima") addresses geographic preferences in relation to photofinishing kiosks. Narushima discloses a color-managed printing system, which contains a processing section for "desirable reproduction". This module addresses the observation that the preferred reproduction of common memory colors such as skin, foliage, and blue sky may not be the same as accurate calorimetric reproduction, both in terms of color specification as well as tone scale and image structure characteristics. Narushima describes a method for determining the preferred reproduction of various objects by using a judging method that may involve studying the flesh color of a large number of people. These preferences are addressed by selective color manipulations in an approximately perceptually uniform color space, e.g. CIELAB. Schematic diagrams of selectively shifting and or contracting colors in CIELAB are shown. The system allows variable selection and processing methods to determine if a color has to be moved. Such methods may include pattern recognition or analyzing the image to find if data are in a predetermined range. More global manipulations of color are also possible. Narushima teaches that the sequence of processing and the image processing parameters in the desired reproduction section can be customized for the intended user at the time of shipment.

Patton describes a system where the customer and/or lab can manually or automatically select the desired skin tone characteristics. Skin tones are selectively identified in scanned images based on at least one calorimetric parameter. The skin tones are then automatically modified towards the preferred position, which can be different depending on whether a dark or a light skin tone was identified. Different modifications for dark and light skin tones in a single image are possible. Skin tone modifications are achieved by color and/or density balance shifts, but preferably by employing a 3D LUT, which selectively modifies skin tones. While Patton identifies contrast of the face as one of the parameters that can be customized, the issue of implementing a global tone reproduction curve optimized for the rendition of people with a wide range of skin tones is not addressed. Likewise, no considerations are given towards obtaining a good texture of skin in the reproduction.

Other inventions use face detection algorithms to treat images containing people differently from scenic pictures without people. One example is given by U.S. Published Patent Application No. US2003/0035578 A1, filed by Dupin and Luo, entitled "Method for Processing Digital Image to Adjust Brightness", hereafter "Dupin") which describes a method for obtaining improved lightness balance for images containing skin or faces. The image is initially balanced using known scene balance methods, followed by an analysis to detect skin colored pixels that creates a skin probability map using an adaptive thresholding method derived from the gradient of the skin probability map. From the detected skin pixels, a brightness adjustment is calculated from the center weighted average of the skin colored pixels and predetermined constants for typical skin pixel brightness values and general algorithm tuning. Dupin does not teach or offer any direction concerning use or adjustment of the algorithm for regional or cultural preferences for skin brightness levels.

The above approaches have the shortcoming of ignoring the importance of structure and texture in skin tone reproduction. The relationship between the visually perceived densities of objects in an image scene reproduction compared to those in the original scene is a critical aspect of image reproduction. Traditionally, conventional silver-halide based photographic systems have produce a well known non-linear, "S"-shaped relationship between the viewed print density (in the case of a print system) vs. scene exposure, such as shown by "The Reproduction of Colour" by Dr. R. W. G. Hunt, Fountain Press, England, Fourth ed., (hereafter "Hunt"), see p. 54. While this type of curve may provide "snappy" reproductions of certain types of scenes, it tends to create a harsh look of peoples faces. With the advent of digital imaging it is possible to create preferred tonal reproductions from any capture source, e.g., photographic films, digital cameras, on a large collection of output media and devices, e.g., photographic, thermal or inkjet paper and any type of electronic display devices, e.g., television, computer displays, personal picture viewing devices and electronic paper.

As a general rule, a smooth appearance of skin tones is preferred. The appropriate texture of skin tones can be achieved using sophisticated image processing algorithms, for example, as disclosed in U.S. Published Patent Application No. US2003/0223622 A1, filed by Simon et al., entitled "Method and System for Enhancing Portrait Images". The approach is complex and processing intensive.

A smooth appearance of skin tones can also be accomplished by much simpler means of selecting an appropriate tone reproduction for a particular situation. U.S. Pat. No. 5,528,339, to Buhr et al., entitled "Color Image Reproduction of Scenes with Color Enhancement and Preferential Tone Mapping"; and U.S. Pat. No. 5,390,036, to Buhr et al., entitled "Color Image Reproduction of Scenes with Preferential Tone Mapping" disclose use of a family of tone reproduction curves optimized for skin tone reproduction. In U.S. Pat. No. 5,528,339, viewed densities on the print were defined as a function of the densities of the original scene. Limits were provided for the slope of this curve, in particular at medium scene densities, which are representative of skin tones and mid-gray tones. These slope limits are lower than what is currently used in most color reproduction systems. While such low slopes provide a smooth appearance of skin tones, it has been determined that the image, including the face, often looks too flat, with shadows having a tendency to look gray and relatively harsh transitions towards highlights.

It is well known to those skilled in the art that the perception of color includes other important attributes in addition to lightness, as addressed by the tone reproduction curve. Attributes that are frequently used in connection with perceptually uniform color spaces are lightness, chroma or saturation, and hue. Preferences for skin tone reproduction can be expressed in those terms, in particular using the CIELAB system (Yamamoto and K. Töpfer, R. E. Cookingham, "The Quantitative Aspects of Color Rendering for Memory Colors", Proceedings of IS&T's 2000 PICS Conference, Portland, Oreg., p. 94.). Individual and regional preferences for lightness, hue and saturation can be addressed by applying overall color and density shifts to the image or by selectively shifting certain regions of color space, e.g., important memory colors, such as skin tones. This approach is disclosed in Torigoe, Narushima, and EP 1139653 A2, filed by Buhr et al., entitled "Color Image Reproduction of Scenes with Preferential Color Mapping".

These approaches of selective color manipulations of skin tones ignore the wider issue of the preferred rendition of people, which also includes hair reproduction and reproduction of whites. White reproduction is important for rendering the background of eyes, teeth and for retaining good detail in clothing. Moreover, they tend ignore the importance of a smooth texture and overall appearance of human faces in image reproductions of people.

It would thus be desirable to provide methods and systems, which have an improved smooth rendering of skin tones and an improved rendering of people overall.

SUMMARY OF THE INVENTION

The invention is defined by the claims. The invention, in broader aspects, provides a method and system for processing a photographic image, which has lightness values, L*, representing one of the colorimetric values of an original scene, the photographic image is transformed. The transformed image has a gamma as a function of CIE 1976 L*, which includes a dark region having a rising slope, a light region having a falling slope, and a plateau region having a slope constantly within 5 percent of a maximum value in said plateau region. The rising slope is at least twice as large as the absolute value of the falling slope. The plateau region is between 10 L* and 30 L* wide. Gamma is a derivative of visually perceived reproduced CIE 1976 L* versus scene CIE 1976 L*. Gamma has a maximum slope between 1.5 and 2.0.

It is an advantageous effect of the invention that improved methods and systems are provided which have an improved rendering of skin tones and an improved rendering of people overall.

BRIEF DESCRIPTION OF THE DRAWINGS

The above-mentioned and other features and objects of this invention and the manner of attaining them will become more apparent and the invention itself will be better understood by reference to the following description of am embodiment of the invention taken in conjunction with the accompanying figures wherein.

DETAILED DESCRIPTION OF THE INVENTION

Figure 1:
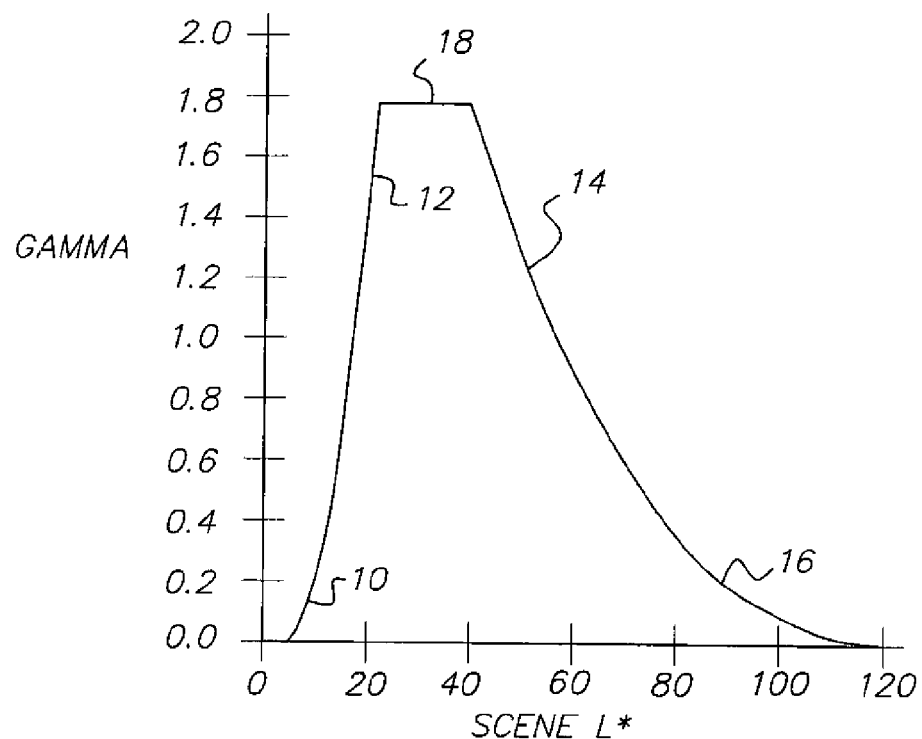
FIG. 1 shows the slope of the tonescale, gamma, as a function of scene lightness (CIE 1976 L*) according to the invention.

The methods and systems disclosed herein relate to a family of tone reproduction curves that produce an improved optimum rendition of people in different geographic locations. This family of tonescales is also referred to herein as "geolocalizable tonescales". The geolocalizable tonescales reduce burnt-out highlights and dark shadows as well as large differences in saturation between light and dark skin tones. The maximum slope limits are higher, while still retaining detailed white reproduction, soft highlights on faces and an overall smooth appearance. The slopes in the scene density region that represents most skin colors are still lower than for traditional S-shaped slopes of tonescales, leading to lower visibility of noise on faces and an overall smooth texture of the rendered faces. Higher slopes of the tonescale towards darker colors also allow retention of adequate color saturation and good detail in black hair.

The geolocalizable tonescales also provide an advantage with respect to the geolocalized customization of the rendition of people. No selective manipulations of specific regions of color space, such as skin tone regions, are required. Geolocalized customization can be achieved by simple manipulations of color and density balance of the image as a whole. These manipulations are more intuitive to photofinishers and are more easily maintained by the manufacturer. The approach is particularly powerful, if a face detection algorithm combined with a density balance algorithm is run prior to applying the tonescale. The algorithm detects images containing people and shifts the density balance of the image overall according to a region-specific aim for skin tone reproduction. For example, images containing people can be rendered lighter as reflected by the regional aim, while scenic images are run through a standard color and density balance algorithm that renders them darker to produce more vivid colors.

In the following description, some embodiments of the present invention will be described as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 17:
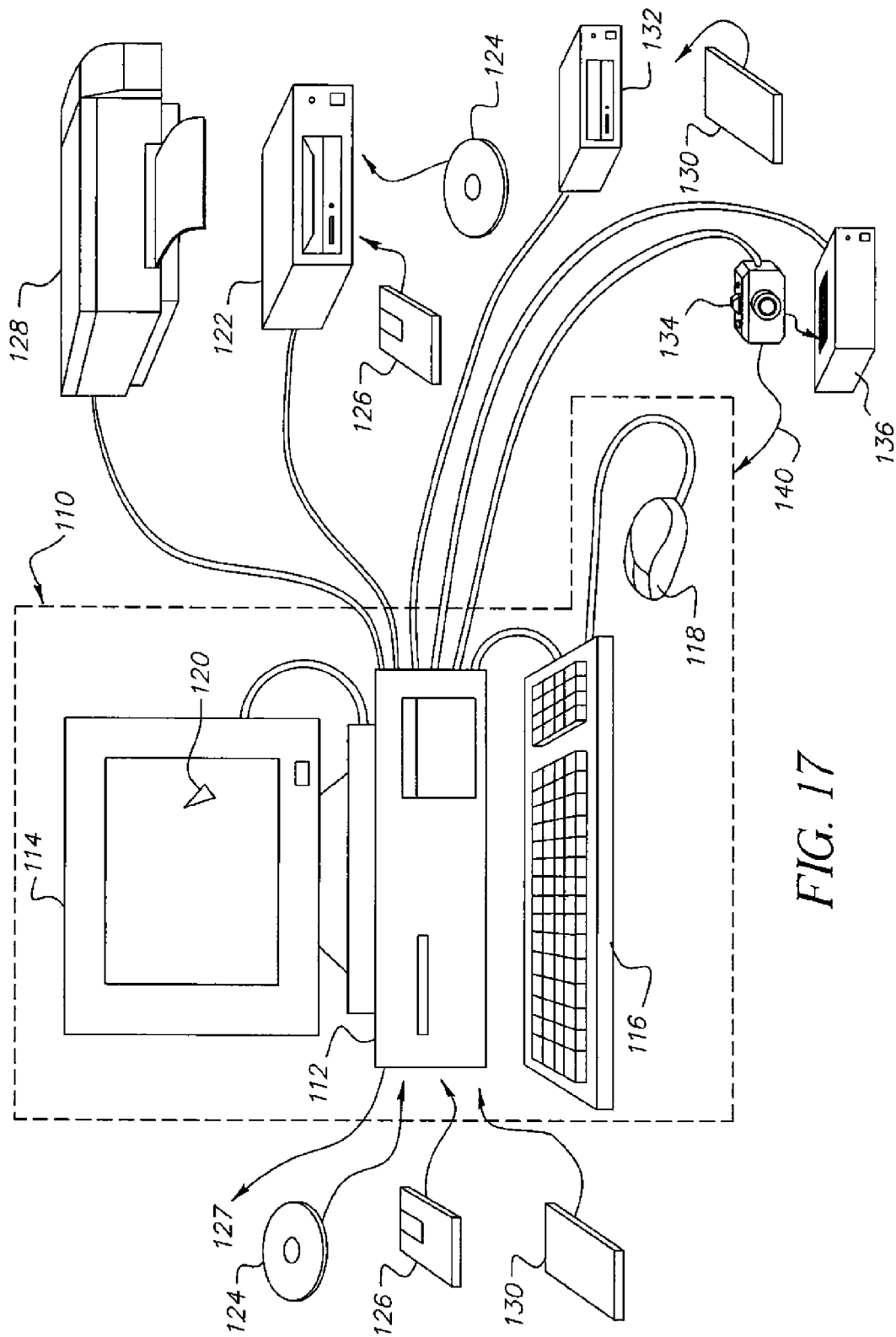
FIG. 17 is a diagrammatical view of another embodiment of the system.

The present invention can be implemented in computer hardware. Referring to FIG. 17, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112, Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to the transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 17 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 112.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

The general control computer shown in FIG. 17 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention is preferably utilized on any well-known computer system, such as a personal computer.

It should also be noted that the present invention can be implemented in a combination of software and/or hardware and is not limited to devices, which are physically connected and/or located within the same physical location. One or more of the devices illustrated in FIG. 17 may be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

In the following, relationships are described between scene colorimetry and colorimetry of the reproduced image that produces final images. Those relationships can be equally described in terms of colorimetry or visually perceived densities of objects in a scene reproduction compared to those in the original scene. Scene colorimetry is defined as the CIE tristimulus values, XYZ, of colored objects in a scene under a given illuminant, calculated according to the color-matching functions of the CIE 1931 Standard Colorimetric Observer Colorimetry of the reproduced image refers to the CIE tristimulus values, XYZ, of the reproduced objects, in hardcopy or softcopy, under a given illuminant calculated according to the color-matching functions of the CIE 1931 Standard Colorimetric Observer. In the discussion herein, the scene and reproduction illuminants are chosen as the CIE Standard Illuminant D50. This is not limiting. The encoding of scene and reproduction colorimetry, i.e. the numerical specification of color information, is not limited to CIE XYZ values. Any reversible transformation between CIE XYZ values of real surface colors and other color encoding metrics can be used, e.g. CIELAB, CIELUV, tristimulus values of any linear combination of the color-matching functions of the CIE 1931 Standard Colorimetric Observer, nonlinear encoding metrics of tristimulus values. In the discussion herein, scene and reproduced colorimetry are represented in terms of CIE 1976 CIELAB values. This selection also defines the measurement methods of color and the signal-processing transformations that determine the meaning of encoded color values. This is not limiting. It is well known in the art that viewing conditions must be defined in addition to colorimetry in order to fully define appearance of color and tone in original scenes and images. It is customary to assume a set of reference viewing conditions in the design of color and tone reproduction systems. Such conditions may include viewing flare, the type of viewing surround, the average luminance and the adaptive white point, and are well known to those of skill in the art, for example, those associated with the definition of ICC Profile Connection Space (PCS, Specification ICC.1:2003-09, File Format for Color Profiles (Version 4.1.0)) for viewing hardcopy and softcopy image reproductions ((E. J. Giorgianni, T. E. Madden, "Digital Color Management", Addison-Wesley, 1997, p. 528). Average viewing conditions assumed for scene capture are also given by Giorgianni and Madden (p. 503).

As discussed above, tone reproduction can be defined in an equivalent fashion as the relationship between the visual densities of the reproduction and the visual densities of the original scene. A metric that can be interchangeably used with CIE 1976 L* values is the visual density of the original scene or the reproduction. Visual density, $D_v$, can be calculated from the Y component of the CIE XYZ values for CIE Standard Illuminant D50 using the following equation:

$$D_v = -\log 10(Y/100) \qquad (1).$$

FIG. 1 shows the slope of a tone reproduction curve (also referred to herein as "gamma") that is the derivative of reproduced CIE 1976 lightness, L*, versus scene CIE 1976 L*. FIG. 1 shows that this slope is rising steeply from dark colors towards a constant value at mid tones, and is then decreasing more slowly towards whites. Most natural skin tones have scene lightness values between 30 and 80. This asymmetry in the slope profile guarantees that transitions between dark and light skin tones are soft, and so are highlights on faces. On the other hand this type of tone reproduction retains plenty of detail in black hair due to the steeper slope towards dark colors.

The asymmetry requirement can be defined by looking at the second derivative of the tone reproduction curve, which can be estimated over specific regions as follows. In the dark region, an estimate of the second derivative can be obtained by subtracting the gamma values, $\gamma_{L2}$ and $\gamma_{L1}$, at scene L* values of 20 and 10 (parts 12 and 10 in FIG. 1) and by dividing by the L* difference of 10 according to Eq. 2a:

$$s_1 = \frac{\gamma_{L2} - \gamma_{L1}}{10}. \qquad (2a)$$

An estimate of the slope in the light region can be likewise calculated by subtracting the gamma values, $\gamma_{L8}$ and $\gamma_{L5}$, at scene L* values of 80 and 50 (parts 16 and 14 in FIG. 1) and by dividing by the L* difference of 30 according to Eq. 2b:

$$s_2 = \frac{\gamma_{L8} - \gamma_{L5}}{30}. \qquad (2b)$$

It has been determined that pleasing, smooth reproduction of skin tones can be obtained, if gamma as a function of scene L* meets the following criteria:

(a) The rising slope in the dark region, $s_1$, is at least twice as big as the absolute value of the falling slope in the light region, $s_2$, as expressed in Eq. 3:

$$s_1 \geq 2 \cdot |s_2| \qquad (3).$$

(b) The plateau region of nearly constant slope (18 in FIG. 1) is at least 10 L* wide, but no wider than 30 L* units. Nearly constant slope means that gamma is within 5% of its maximum value.

(c) The maximum slope, gamma, is between 1.5 and 2.

Figure 2:
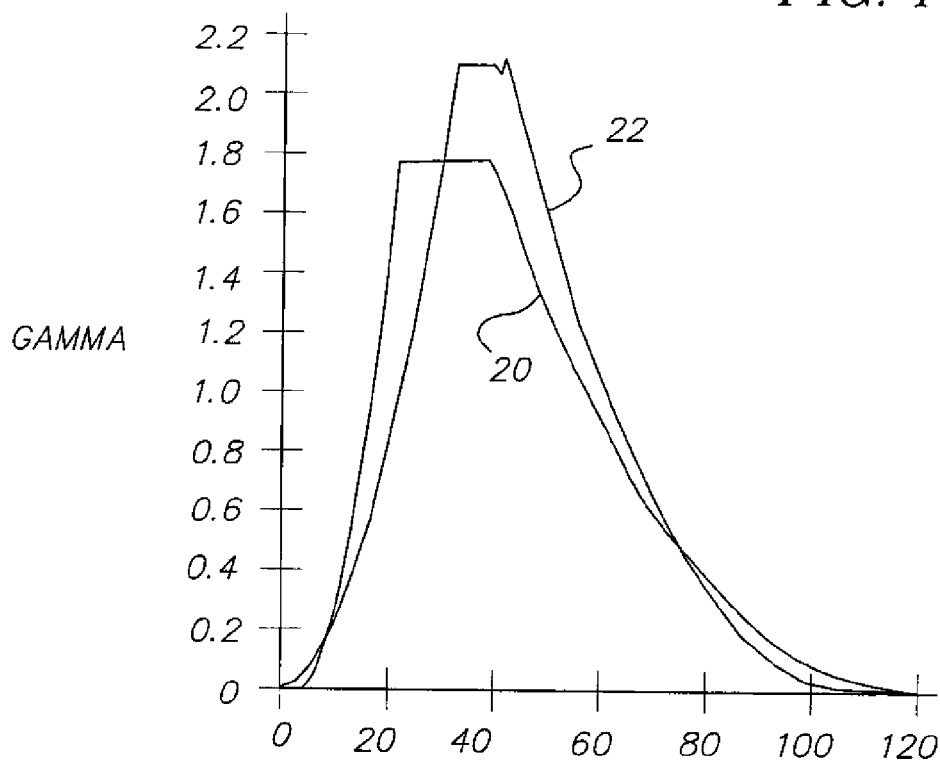
FIG. 2 compares the slope of the tonescale, gamma, as a function of scene L* according to the invention with that of a tonescale falling outside the invention.
Figure 3:
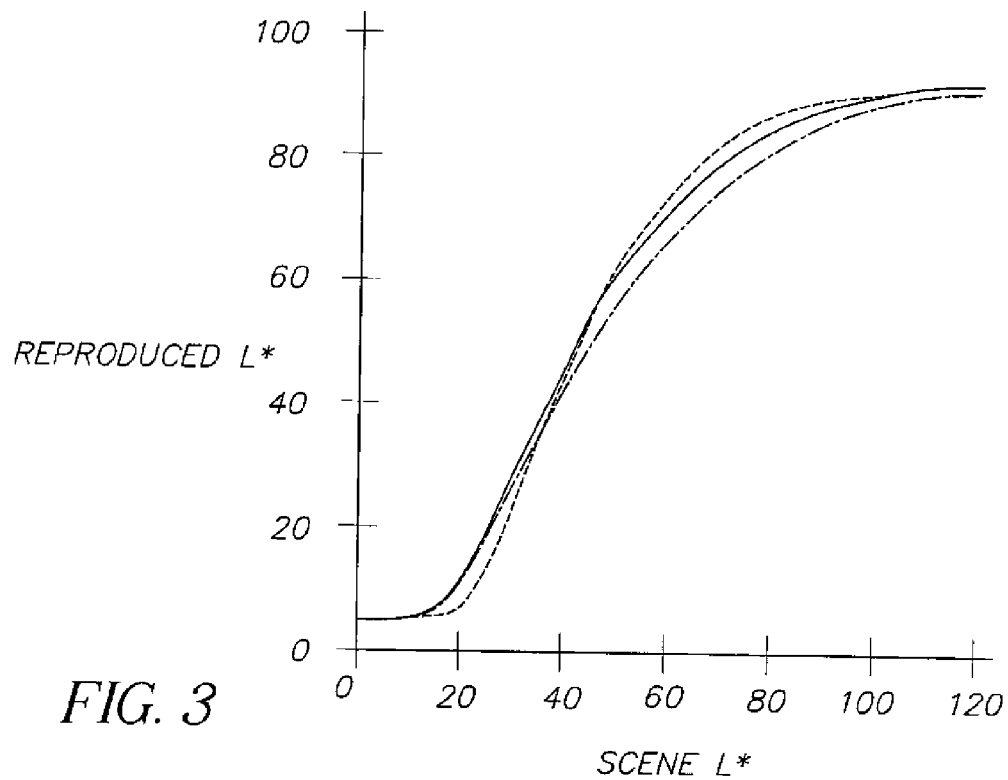
FIG. 3 shows three tonescales according to the invention with varying contrast, reproduced L* displayed as a function of scene L*.

FIG. 2 shows the slope of the tone reproduction curve, gamma, as a function of scene L* for a geolocalizable tonescale (designated by reference number 20) compared with a tonescale (designated by reference number 22) that exhibits S-shape characteristics and falls outside the invention. It can be clearly seen that, in the latter case, the maximum slope falls outside the range specified above, and that the two derivatives $s_1$ and $s_2$ are very similar in magnitude. FIG. 3 shows a contrast series of curves, displayed as reproduced L* as a function of scene L* of a geolocalizable tonescale.

Figure 4:
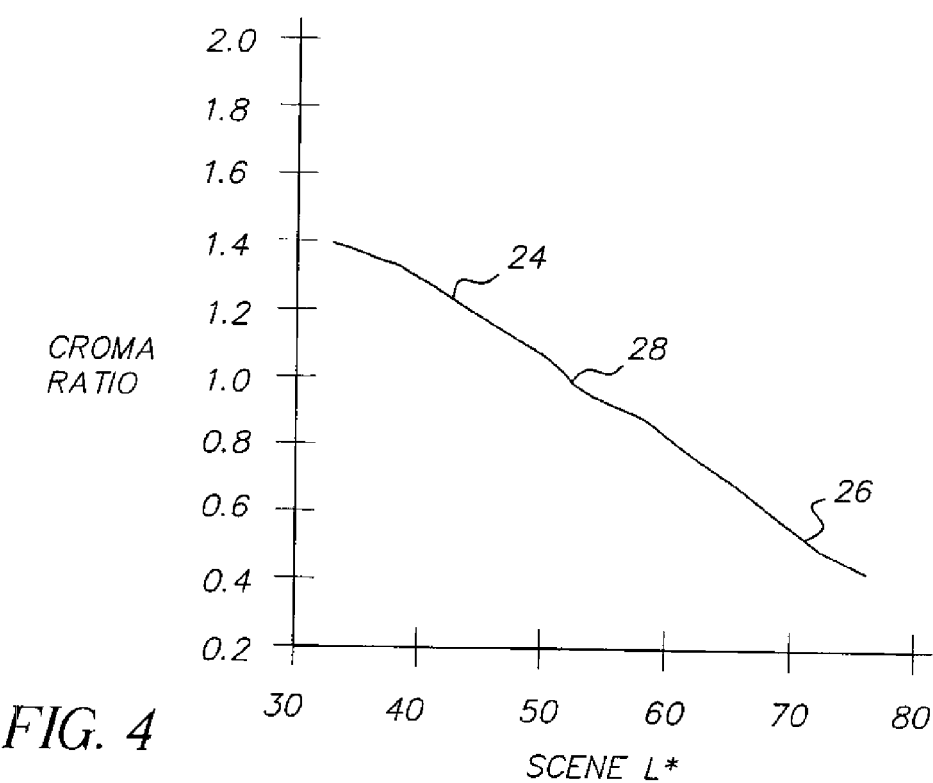
FIG. 4 shows the chroma ratio of skin tones, defined as CIE 1976 a,b chroma, C*, of the reproduction divided by the scene chroma, as a function of scene L* of the skin tones.

Another important aspect of producing a smooth appearance and a pleasing texture of faces is the change in color saturation or chroma as a function of the lightness (CIE 1976 L*) of skin tones. Traditional S-shaped tone reproduction curves tend to reduce the chroma of light colors in the reproduction while enhancing darker skin tones, often giving them a saturated orange appearance, which is not preferred by viewers. Requirements for smooth chroma reproduction are most easily quantified if the chroma ratio of reproduced skin colors (CIE 1976 a,b chroma, C*) is divided by the corresponding C* values in the original scene. This chroma ratio is displayed in FIG. 4 as a function of L* of the skin tones in the original scene. Preferred reproductions of people are obtained if the slope of the curve shown in FIG. 4 meets certain requirements:

(a) The difference of the chroma ratios at scene L* values of 75 and 50 (parts 26 and 24, $CR_{75}$ $CR_{50}$) divided by the L* difference of 25 must fall below the threshold of 0.04 given in Eq. 4:

$$s_3 = \left| \frac{CR_{75} - \gamma_{50}}{25} \right| \leq 0.04. \qquad (4)$$

(b) The slope of the curve between L* values of 25 and 50 must be smaller or equal to $s_3$ defined in Eq. 4, but not negative.

(c) The chroma ratio for skin tones at a mid tone scene L* value of 60, part 28, must fall between 0.75 and 1.25.

It preferred that the geolocalizable tonescales meet these criteria.

As is known in the art, individual and regional preferences for lightness, hue and saturation can be addressed by applying overall color and density shifts to the image or by selectively shifting certain regions of color space, e.g., important memory colors, such as skin tones. The term individual preference refers to the preferred skin tone reproduction of an individual lab or person. Regional preference refers to the average preferred skin tone reproduction in a given country or region.

It has been determined that color and density shifts applied to the whole image are effective in producing pleasing skin tones and overall reproductions of the images, if the tone reproduction curves according to the invention are used. The geolocalizable tonescales also minimize deleterious effects on the reproduction of other colors in the image, e.g., other memory colors, foliage, blue sky, near neutral colors including blacks and whites, colorful fabrics, flowers. The relationship of skin tones to overall reproduction of an image is often referred to as skin-to-neutral reproduction. It has been determined that there is little benefit in applying shifts to selected regions of color space, if the neutral reproduction that corresponds to the preferred skin tone reproduction meets the following criteria:
- (a) The reproduced CIELAB a* and b* values of the 20% gray corresponding to the preferred skin tone reproduction fall into the ranges of $-3<a^*<3$ and $-10<b^*<2$.
- (b) The reproduced CIELAB a* and b* values of the 75% reflector (Munsell N9 according to the Munsell Book of Color) corresponding to the preferred skin tone reproduction fall into the ranges of $-1<a^*<3$ and $-5<b^*<0$.
- (c) The reproduced CIELAB a* and b* values of a 2.5% reflector (e.g. black cloth) corresponding to the preferred skin tone reproduction fall into the ranges of $-1<a^*<3$ and $-6<b^*<0$.
- (d) The L* shifts required for preferred skin tone reproduction compared with the preferred reproduction of other colors do not exceed an absolute value of 12.

It is believed that few regional and individual preferences for skin tone reproduction would fall outside these ranges. The L* shifts of part (d) for skin tones and non-skin tones can be readily predetermined empirically. Digital images can be readily tested for these criteria to determine whether the geolocalizable tonescales would be likely to provide a suitable result.

Figure 5:
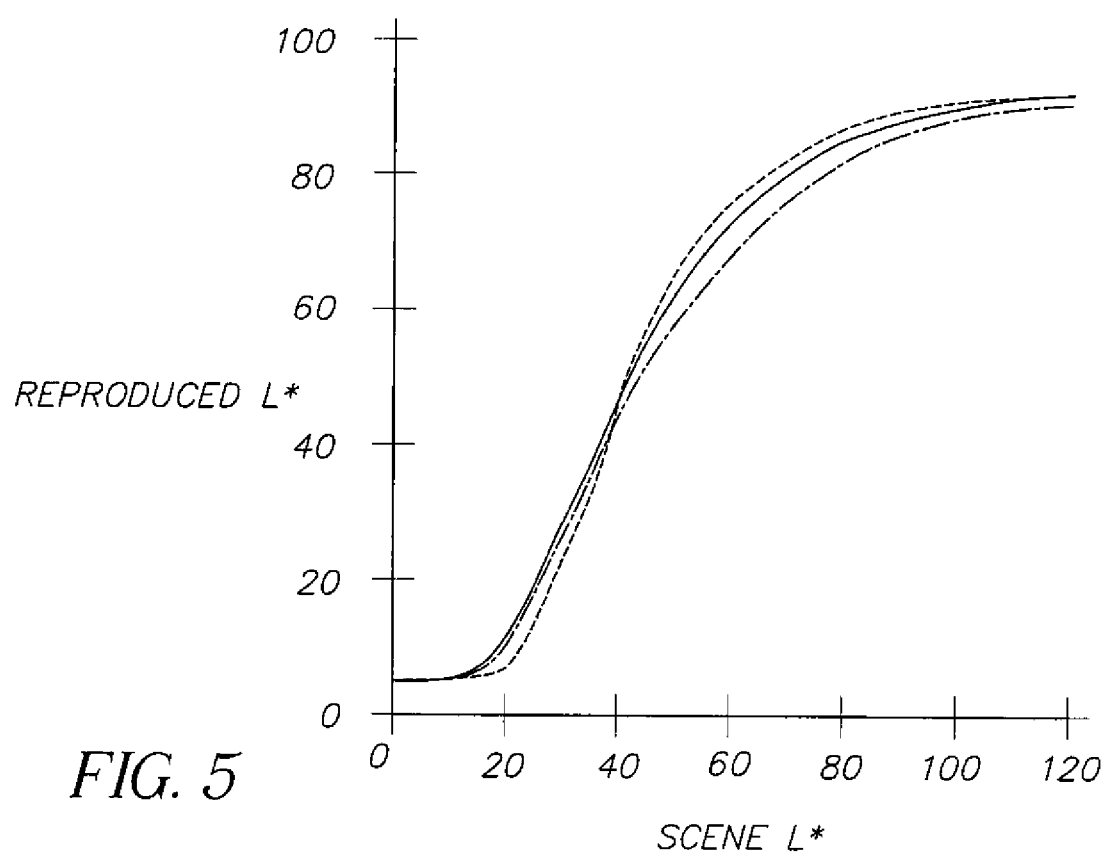
FIG. 5 shows three variations in preferred lightness applied to a single tonescale according to the invention, reproduced L* displayed as a function of scene L*.

FIG. 5 shows a tone reproduction curve according to the current invention with three different adjustments for preferred skin tone lightness.

The tone reproduction curves according to the invention in combination with customized setups to meet regional preferences for skin tone reproduction can be implemented in a wide variety of color reproduction systems, intended to provide hardcopy or softcopy reproductions of original scenes. Some examples are given below.

Capturing the original scene parameters can be accomplished by any light sensitive element, or sensor, capable of sensing the tonal values of the objects in a scene in a manner, which quantitatively determines their relative log luminances. The sensor is typically contained in a device or camera, which controls its exposure to light. Examples of cameras and sensors include but are not limited to cameras using photographic films and electronic cameras using CCD (Charge-Coupled Device) sensors. Cameras and sensors may be of any suitable physical dimensions.

Figure 6:
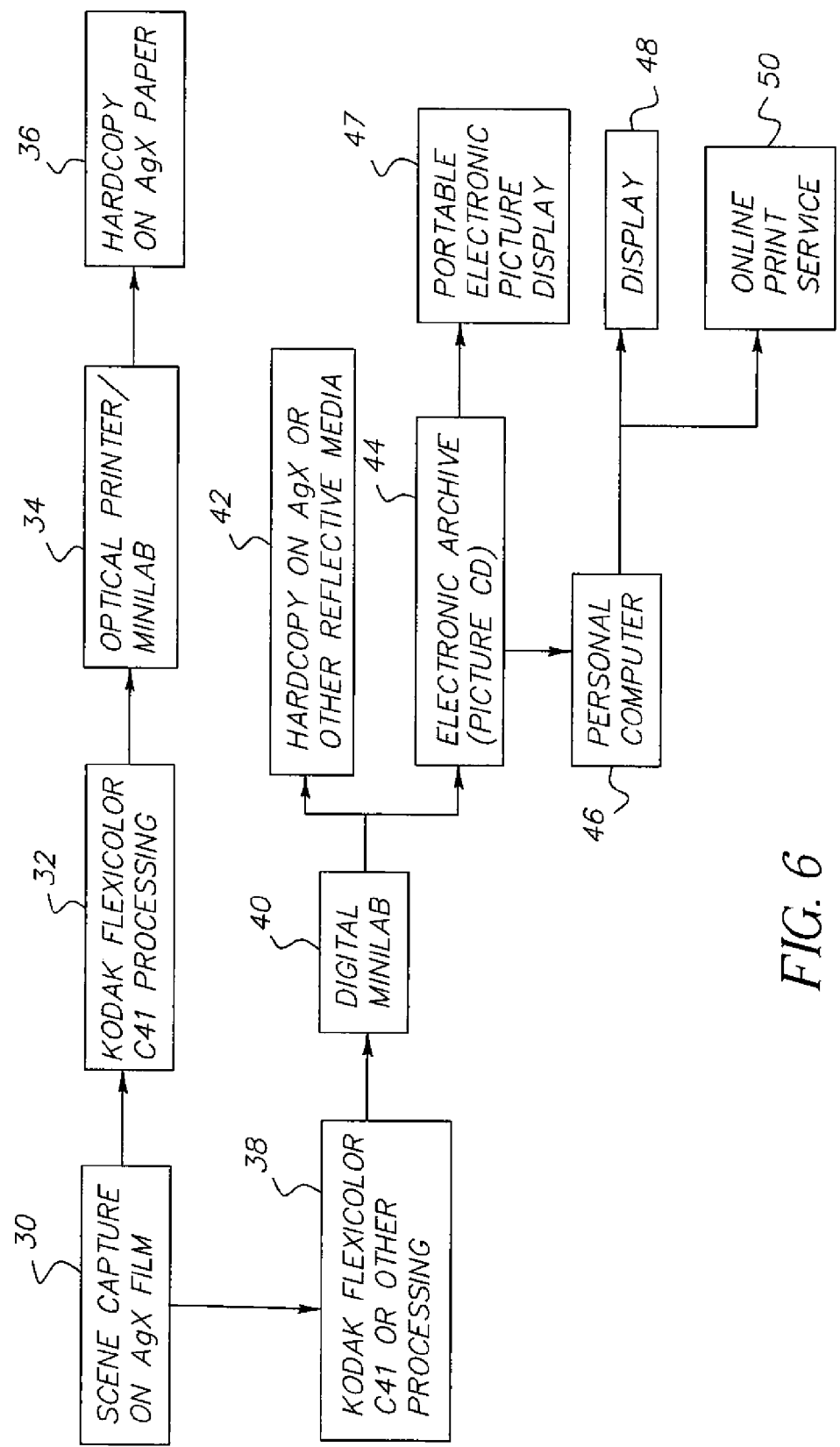
FIG. 6 is a diagrammatical view of an embodiment of the system.

FIG. 6 shows an embodiment of the system. The sensors in conventional photographic applications are silver halide based photographic materials that may be negative or positive working film, semi-reflective film, or reflection paper although the most common embodiment is color negative film. Conventional films and papers contain a multilayer structure with separate color record imaging materials. Films specifically designed for scanning are also appropriate. The film may or may not be contained in spools, cartridges, or similar containers, depending on the type of camera in which it is used. The film may contain non-optically sensitive materials, such as magnetic or electrical elements. Scene capture may be accomplished using all currently available silver halide photo-sensitive films and papers as well as those that will appear in the future.

In silver halide photography, the scene is captured and stored as latent image in the silver halide emulsion grains. Subsequent to or concerted with photosensitive element exposure, the recorded information is often converted to a more permanent representation of the original scene parameters by some process, typically chemical although it can be also be thermal, magnetic, optical, or electrical in nature. The resultant recorded image is typically a transparent film, although it may be a reflection material or any other storage medium. A typical embodiment for conventional silver halide photography is the use of a 35 mm single lens reflex camera exposing color negative film 30 followed by Kodak™ Flexicolor™ C-41 chemical development 32 (marketed by Eastman Kodak Company of Rochester, N.Y.) to produce an optical density varying representation of the original scene.

The visual reproduction of the original scene in the form of a hardcopy print 36 can be generated by optically printing a photographic film 30 onto silver halide photographic or other light sensitive paper 36. The printing process can be additive or subtractive and the photographic materials can be negative or positive working (negative film with negative paper or positive film with positive paper). To achieve the preferred final viewed reproduction, the paper response characteristics must be accounted for in the film to be printed so that the resultant produced image has the desired tone reproduction characteristics. A suitable embodiment of the optical printing process is an optical mini lab 34.

Steps 30 and 32 are also appropriate as input for digital photofinishing, but films and/or development processes not suitable for conventional optical printing may be used. A film intended for scanning can be characterized by having low suitability for both direct viewing (e.g., projection) and optical printing. The film intended for scanning may be suitable for wet, aqueous processing including lamination and chemical transfer methods, or it may be suitable for dry, thermal processing by being comprised of incorporated development chemicals. Apparently dry photo processes in conjunction with conventional silver halide films may also be used, such as in the Film Processing Station (FPS) offered Kodak Picture Maker G3 kiosk. When the film is inserted into the FPS, a proprietary developing agent is applied to the film with no resulting by-product, and the film is directly scanned. The wider range of suitable films and chemical processes for development is indicated by element 34. The processed film is scanned, digitally processed and printed in a digital mini lab, an example of which is described in greater detail by U.S. Pat. No. 6,574,373 B1, to Morba and Hicks, entitled "Method and Apparatus for Printing Digital Images". The images may be printed on silver halide paper or any other suitable reflective print media 42. Many non-light-sensitive imaging materials are conveniently used by electronic printing processes to produce high-quality reproductions. The printing process can be based on many technologies. The method of image formation can be half-tone, continuous tone, or complete material transfer. The imaging material can be transparent film, reflective paper, or semi-transparent film. The materials can be written on to produce pictorial images by thermal dye transfer, ink jet wax, electrophotographic, or other pixelwise writing techniques. These processes use three or more colorants to create colored pictorial representations of pictorial scenes. The colorants may be dyes, toner, inks, or any other permanent or semi-permanent colored material. Many non-light-sensitive imaging materials are conveniently used by electronic printing processes to produce high-quality reproductions. The printing process can be based on many different technologies. The method of image formation can be half-tone, continuous tone, or complete material transfer. The imaging material can be transparent film, reflective paper, or semi-transparent film. The materials can be written on to produce pictorial images by thermal dye transfer, ink jet, wax, electrophotographic, or other pixelwise writing techniques. These processes use three or more colorants to create colored pictorial representations of pictorial scenes. The colorants may be dyes, toner, inks, or any other permanent or semi-permanent colored material.

A digital representation of the images may also be written to permanent storage media, e.g., floppy disks, Picture CDs or DVDs 44. The images stored in such form may be read into a personal computer 46 and displayed by on the computer monitor 48 by suitable software applications. Assuming the personal computer is connected to a network the images may also be submitted to an online print service 50 to obtain hardcopy prints. Alternatively, the digital storage media can be used in portable electronic picture display 47 with a preferred display size of at least 4×6 inches. Suitable display technologies include by are not limited to CRT (cathode ray tube), LCD (liquid crystal display), OLED (Organic Light Emitting Diode) and plasma displays. An example of such a viewing device is the Epson P-1000 PhotoViewer, which uses LCD technology, although the image diagonal of 3.8" of this device is smaller than desired.

Figure 8:
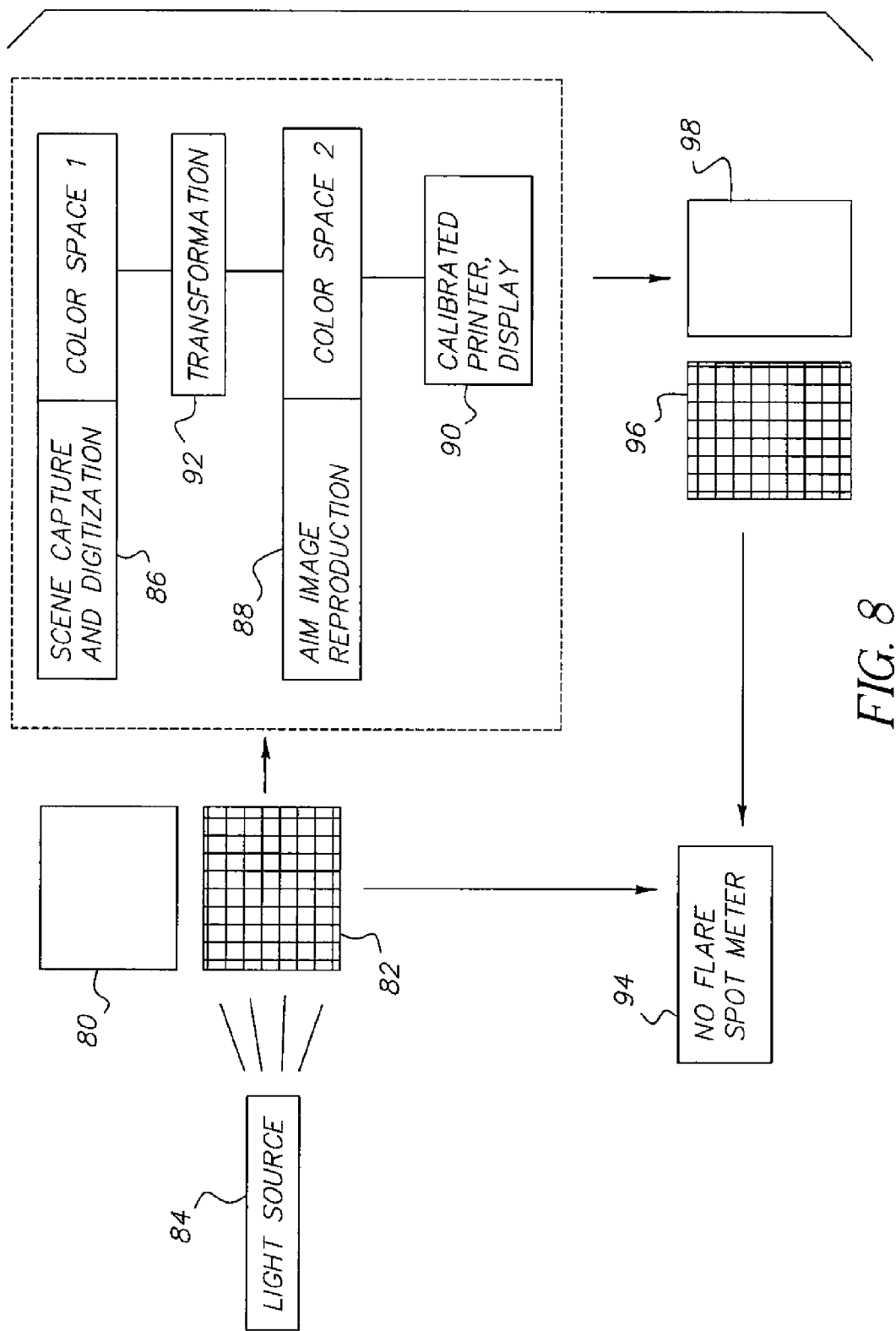
FIG. 8 is a diagram of a test procedure to check if a color reproduction system meets the specifications for tonal reproduction according to this invention.

The invention describes the tonal relationship between the visually perceived densities of objects in the image scene reproduction, as exemplified by 36, 42, 47, 48 and 50 in FIG. 6, compared to those in the original scene. While those skilled in the art will recognize that the tonal properties of the reproduction in sequences 30, 32, 34, 36, and alternatively 30, 38, 40, 42 can be tightly controlled, the alternative output paths rely on a file format on the storage medium 44 that can be correctly interpreted by subsequent applications in order to produce the intended tonal reproduction. A form of color encoding commonly used at the present time is sRGB (IEC 61966-2-1) in combination with the ICC color management paradigm. It is also assumed that the output devices and media 47, 48, 50 are calibrated to reproduce colors encoded in ICC profile connection space (PCS). FIG. 8 describes a test procedure to check if a color reproduction system meets the specifications for tonal reproduction according to this invention.

Figure 7:
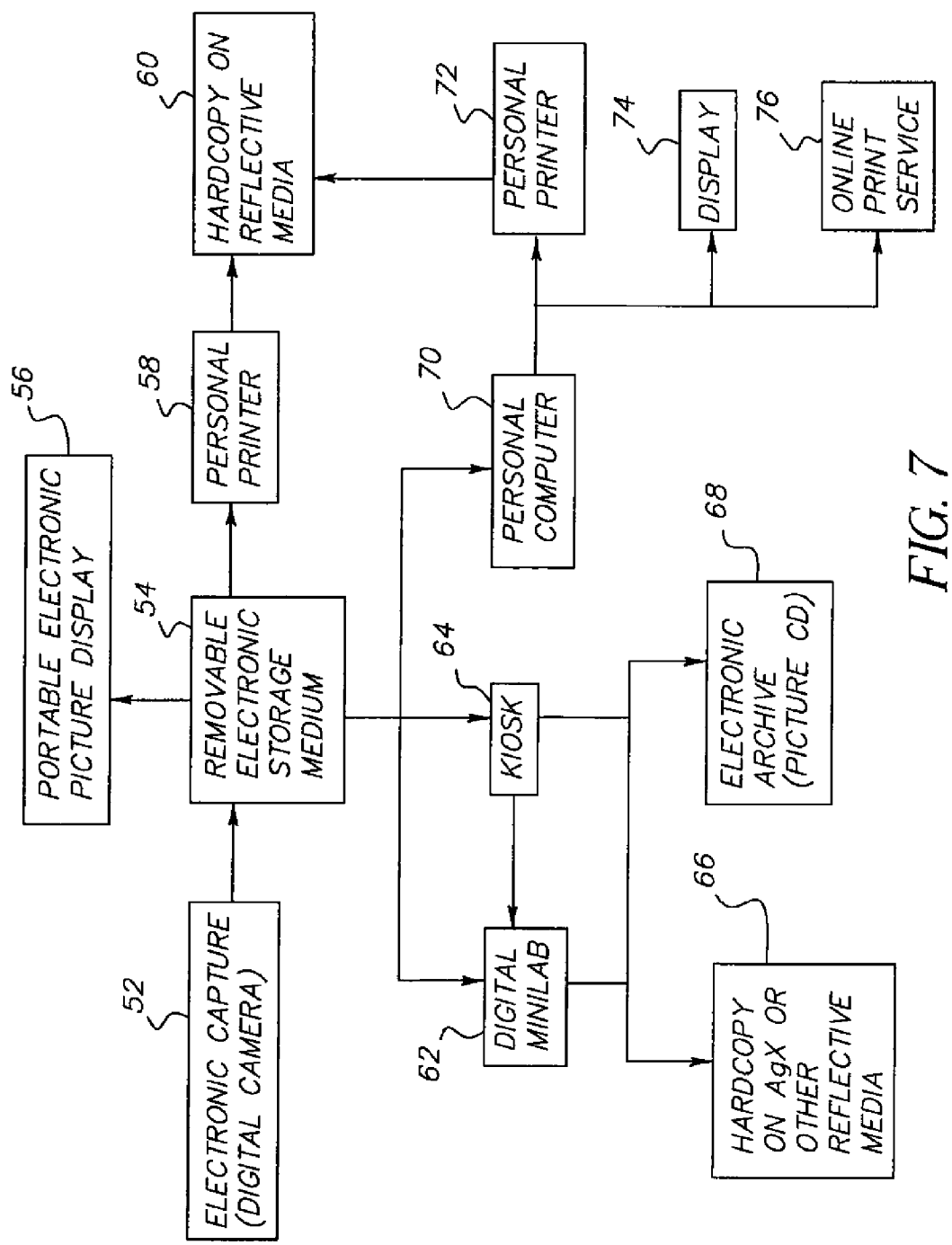
FIG. 7 is a diagrammatical view of another embodiment of the system.

FIG. 7 shows a diagram of another embodiment of the system used for digital scene capture. The image sensors in digital cameras 52 can be, but are not limited to single-chip color charge-coupled devices (CCD) or CMOS image sensors. The analog output signal from the image sensor is converted to digital data by an analog-to-digital (A/D) converter. The digital data is processed by a CPU or digital signal processor. The processed digital image file is provided to a memory card interface, which stores the digital image file on the removable memory card 54 or on another type of digital memory device, such as a floppy disk or magnetic hard drive. The removable memory card 50, which is well-known to those skilled in the art, can include, for example, a memory card adapted to the PCMCIA card interface standard, as described in the PC Card Standard, Release 2.0, published by the Personal Computer Memory Card international Association, Sunnyvale, Calif., September 1991. The removable memory card 30 can also be adapted to the Compact Flash interface standard, such as described in the CompactFlash Specification Version 1.3, published by the CompactFlash Association, Palo Alto, Calif., Aug. 5, 1998, or to other memory devices such as the well-known SSFDC (Solid State Floppy Disc Card) and Memory Stick formats or SmartMedia™ cards.

The camera 52 or the storage medium can be directly connected to a personal printer 58 such as the Kodak Printer Dock 6000 marketed by Eastman Kodak Company, which produces hardcopy prints using thermal printing technology. Suitable output technologies were discussed in connection with part 42 in FIG. 6. Alternatively, the removable memory card 54 may be read by the input unit of a digital mini lab 62 or a kiosk 64. Units 62 and 64 are both capable of producing hardcopy prints on reflective media 66 and of writing digital representations of the images to permanent storage media. This section is identical to the output of the mini lab 40 discussed in FIG. 6. The operation of an imaging kiosk, such as a Picture Maker® kiosk produced by Eastman Kodak Company, is describe in U.S. Published Patent Application No. U.S. 2004/0041819 A1, filed by Barry and Minns, entitled "System and Method for Generating an Image Fulfillment Order". Alternatively, the removable memory card can be used in portable electronic picture display 56 analogous to 47 in FIG. 6. Moreover, the removable memory card may be read by a personal computer 70 using a special card reader as a peripheral or by directly connecting the camera to the computer, which commonly done using the Universal Serial Bus (USB) interface.

As discussed in connection with FIG. 6, the images may be displayed by on the computer monitor 48 by suitable software applications. The images may also be printed by a personal printer 72 to generate a hardcopy on suitable reflective print media 60. Printers 58 and 72 may be the same device, or they may be different and use different printing technologies. Assuming the personal computer is connected to a network the images may also be submitted to an online print service 76 to obtain hardcopy prints.

The methods and systems herein relate to the tonal relationship between the visually perceived densities of objects in the image scene reproduction, as exemplified by 56, 60, 66, 74 and 76 in FIG. 6, compared to those in the original scene. In this case, the file format and the color encoding on the storage medium 54 that must be universally understood and correctly interpreted by subsequent applications in order to produce the intended tonal reproduction.

A form of color encoding commonly used at the present time is sRGB (IEC 61966-2-1) in combination with the ICC color management paradigm. It is assumed that the output devices and media 56, 58/60, 66, 74, 76 are calibrated to reproduce colors encoded in ICC profile connection space.

FIG. 8 illustrates a test procedure to check if a color reproduction system meets the specifications for tonal reproduction according to this invention. This procedure can be used as an initial test and on an ongoing basis to determine if a particular system remains within the specification. In this test procedure, two test targets 80, 82 of uniform size are provided. Target 80 is a spectrally uniform gray, i.e. it exhibits constant percent reflectance (20%) in a wavelength spectrum of from 380 nm to 780 nm. Target 82 is a target with multiple neutral and skin tone patches covering the full range of potential visual densities of these objects in the scene. An example of a suitable target is the GretagMacbeth Digital Color Checker SG. Both targets are large enough so that when photographed as described below, each target substantially fills the image capture area of the capture device.

A lighting system 84 is provided to uniformly illuminate the targets, mounted on a uniform gray (20% reflectance) background, at approximately a 45° angle of incidence. The lighting should provide reasonably specular illumination typical of high quality, low flare viewing conditions. The spectral quality of the lighting should be similar to that for which the imaging system under test is designed. Under constant illumination conditions from lighting system 84 and with a scene capture apparatus 86, e.g. a photographic or digital camera, oriented perpendicularly to the targets, each of the target images is captured according to ISO standards for the image capture device. Additionally, the reflection spectra of each color patch in target 82 and the corresponding area of target 82 are measured using a very low flare telespectroradiometer 94. A suitable embodiment is the Photo Research telespectroradiometer 705. Each measurement is made with a spot size one-fourth as large as the density step area being measured. Using identical lighting, image device and radiometer conditions, target 80 is captured and measured as described above.

Using the imaging system 88 under analysis including scene capture apparatus 86 and image reproduction stage 90 and having an overall transformation characteristic represented by transformation box 92, a hardcopy reproduction of the target images is produced by a suitable output device. The reproduction is made in such a manner that the N/3.5 Grey patch in the reproduction match those of the original Munsell N/3.5 Grey Patch. A 1.0 scene density relative to a 100% diffuse reflector is reproduced at a density of 1.0+0.05.

The reproduced prints are uniformly illuminated with lighting system 84 at a 45° angle of incidence and the visual step densities are measured with the very low flare radiometer 94. It will be understood that the targets and reproductions preferably are illuminated and measured under identical conditions. These measurements include the target and reproduction illuminant. If this is not the desired capture and viewing illuminant, the illuminant spectrum can be divided out, if the spectral reflectance of one of the neutral target patches in target 82 is known. CIE XYZ values for all patches are calculated from the target and reproduction reflectance spectra, the spectrum of the illuminant, and the CIE color-matching functions of the observer, using standard methods. Before proceeding, the measured XYZ values on the target 82 have to be corrected for any target illumination non-uniformity using the target 80 measurements in the same location as the target 82 steps Likewise, the measured step XYZ values on target 96, the reproduction of target 82, must be corrected for any target illumination non-uniformity, any field exposure non-uniformity by the scene capture apparatus 86 onto the film or sensor and any field exposure non-uniformities present in the hardcopy image reproduction apparatus 90 using target 98. CIELAB values for the target and the reproduction, referring to the CIE Standard Illuminant D50, are calculated using standard procedures.

The reproduction of the targets on softcopy devices can be measured using the same telespectroradiometer. Since these devices are self-luminous displays, the target illumination system 84 is not needed. The measurements are performed in the absence of any ambient illumination.

If the sophisticated lighting setup and measurement equipment described above is not available it may also be possible to directly measure visual densities of the original chart and the hardcopy reproduction using a suitable reflection densitometer, such as an X-Rite 310. In this case, however, it would not be possible to test the requirements for chroma reproduction of skin tones and for deviations from neutral and viewing flare according to the assumed standard viewing conditions must be added. Smaller clip-on colorimeters, such as the MonacoOPTIXXR, can also be used to characterize softcopy displays.

EXAMPLE 1

In a particular embodiment, exposed Kodak Gold 200 Gen. 6 film is processed by Kodak™ Flexicolor™ C-41 chemical development and submitted to a digital mini lab for printing. Kodak Gold 200 film was used as a representative example of color negative films from a variety of vendors.

Figure 9:
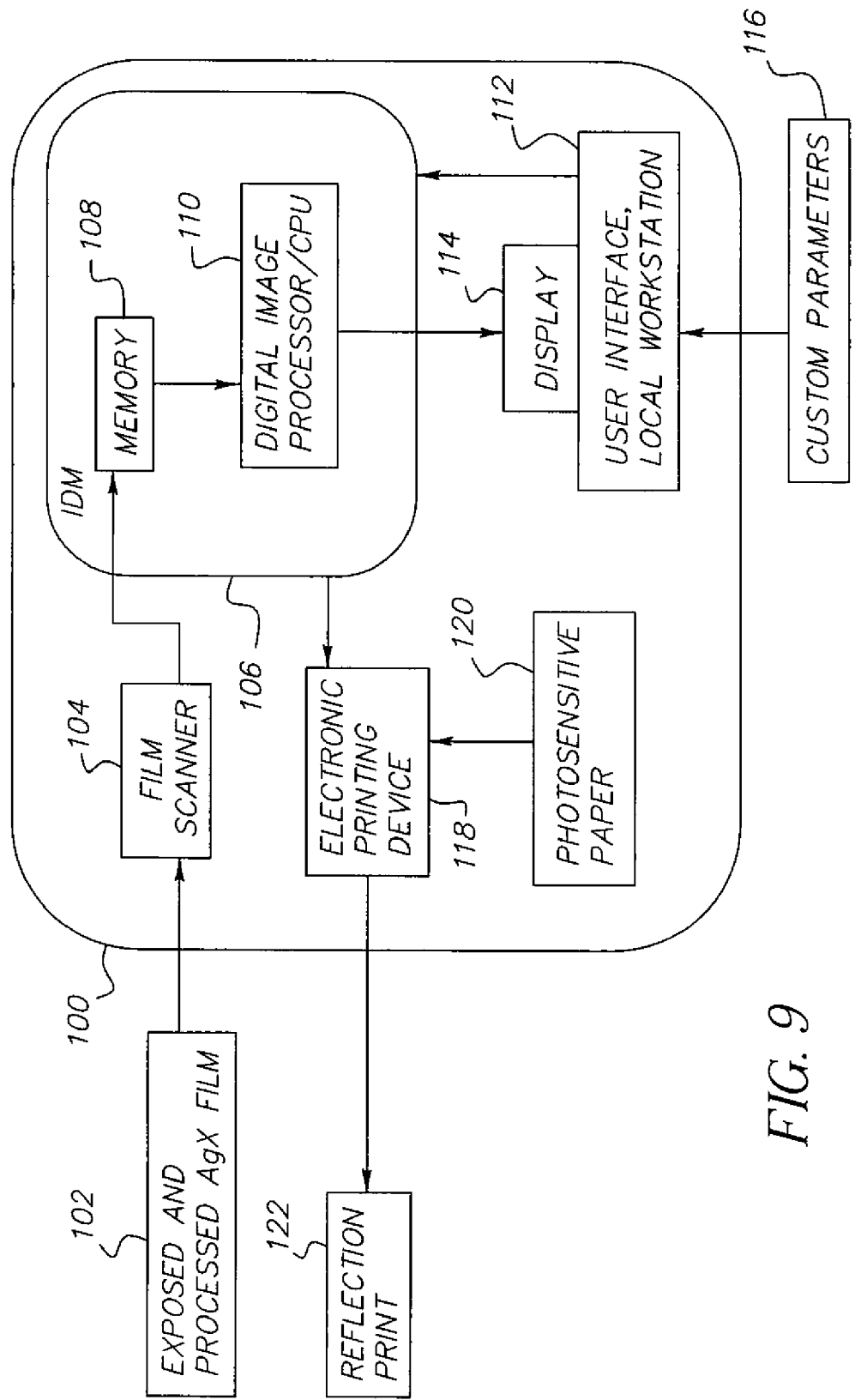
FIG. 9 is a diagrammatical view of another embodiment of the system.

The processed roll of film was submitted to a digital mini lab for printing. Referring to FIG. 9, the digital mini lab 100 includes a scanner 104, which is designed to receive and scan a roll of developed film 102. The roll of developed film 102 is transported past a sensor in scanner 104, which scans the images on the film 102 so as to provide a digital record of the customer images. The scanner 104 scans at a resolution sufficient to provide the desired quality prints, preferably, at a resolution of at least 1000×1500 pixels per inch for a 35 mm film frame, and more preferably at a high resolution equal to or greater than about 2000×3000 pixels per inch for the 35 mm film frame. Examples of suitable scanners include the Pakon F-235 scanner, the Kodak HR-200, and HR-500 scanners, the Kodak 1640 and 1650 scanner, Noritsu scanners supplied with Noritsu digital mini labs such as the QSS3011 and other QSS3XXX series mini labs.

The digital record of the image is forwarded to an image data manager (IDM) 106 wherein the images are manipulated as preprogrammed. In the embodiment illustrated, IDM 106 comprises a computer (microprocessor 110) used for manipulation of the digital images contained in the digital record file. The IDM 106 includes a memory 108 for storing of the digital record of the customer image order.

The IDM 106 contains an electronic printing device 118, which exposes the individual images of the customer order onto photosensitive material 120. Devices which can be used to print on light-sensitive materials include CRT, LED (Light Emitting Diode), LVT (Light Valve Technology), LCD, Laser, as well as any other controlled optical light generating device. All these devices have the ability to expose 3 or more light-sensitive layers in a light-sensitive material to produce a colored image. They differ mainly in the technology on which the devices are based. In the particular embodiment illustrated, the digital printer 118 is a MLVA (Micro Light Valve Array) printer with a resolution of 400 ppi printer or a laser printer with a resolution of at least 300 ppi. The printer scans a light containing image data onto cut sheets as they move past an exposure gate. In order to produce smooth, high quality reproductions of people the printer must have at least a resolution of 250 dpi (dots per inch) and 8 bits of information per color channel. An example of such a image printer device would be a Noritsu QSS3011 mini lab system with a scanner capable of resolution in excess of 2000 pixels per inch and a laser printer with a resolution of 320 pixels per inch. The photosensitive material 120 is KODAK EDGE Generations Paper.

A CPU (computer) 110 is provided for controlling operation of the apparatus and its various components. A user/operator interface 112, which includes a viewing screen 114, is also provided, for allowing an operator to enter instructions for operation of the apparatus and monitor operation of the apparatus as is customarily done. Any regional customization of the image processing can be entered via this interface.

An appropriate computer printing program is provided for controlling operation of the IDM 106. The computer program is provided in an appropriate format which allows loading of the program into the apparatus 100 which causes the IDM 106 to perform the required steps. In particular, the computer program is designed so that the IDM 106 will first obtain and store a complete customer image order prior to printing. Appropriate enhancement algorithms, which have been preprogrammed into IDM 106, are applied to the customer image order so as to improve the overall aesthetic appearance of the images when printed. It is to be understood that any desired enhancements and/or corrections may be applied to the images. For example, but not by way of limitation, the following are a few of the enhancements that may be applied: contrast adjustment, red eye removal, color balance, removal of dust marks or scratches and sharpness adjustments. In addition, custom corrections, such as crop and zoom, can be programmed or manually entered into the digital printer. The implementation of the tonescale according to the invention is part of this image processing sequence. After the stored digital images are enhanced, they are forwarded to the printer 118 for printing.

Figure 10:
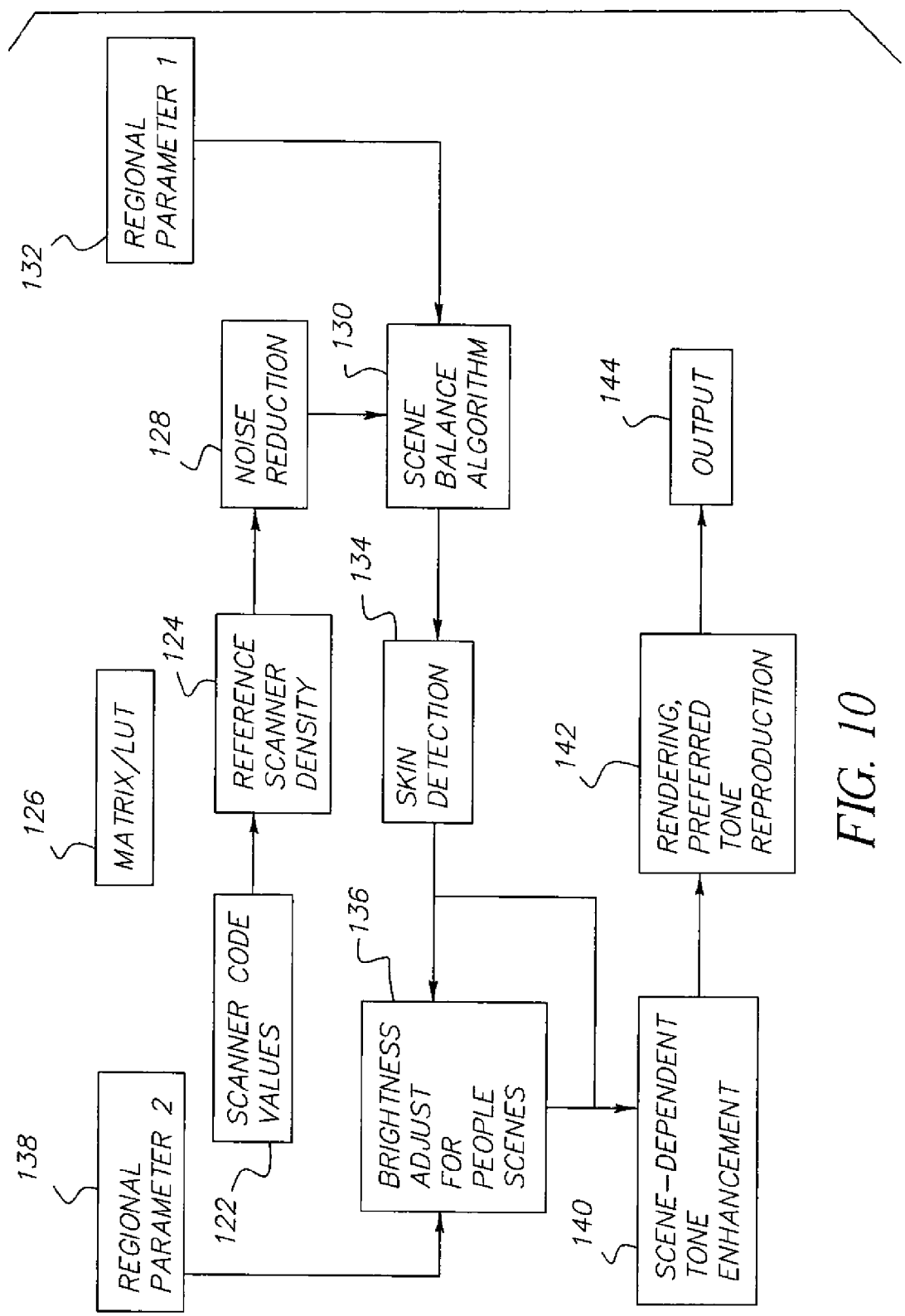
FIG. 10 is a diagrammatical view of features of the transform of the system of FIG. 9.

FIG. 10 shows the sequence of image processing steps that is required in order to implement the geolocalized tonescale according to the invention in combination with regional settings for the preferred reproduction of people. After scanning the film 102 with scanner 104 a digital representation of the images is stored in the memory 108 of the IDM 106. These scanner code values 122 preferably represent film densities. For any further processing it is advantageous transform the scanner code values 122 to a common printing density space 124. The calculation of scanner and printing densities is well known in the art and is described by Giorgianni and Madden, p. 456, 457. The term printing density traditionally referred to the densities of the film as "seen" by the photographic paper in an optical printer with a particular light source. The film transmittance corresponding to density is calculated as the normalized integral of the product of the film spectral transmittance with the filtered spectral distribution light source (and lens) of the printer and the spectral sensitivity of the receiving medium, in this case photographic paper.

It is possible to produce scanners with spectral responsivities that approximate the case of optical printing. This match is never perfect and individual scanners may vary. Therefore it is advantageous to convert the actual scanner densities to reference scanner densities for a common well-defined scanner, which closely resemble optical printing densities. This can frequently be accomplished by transforming the original scanner densities 122 with a LUT and matrix to produce reference scanner densities 124. For the convenience of using 12 bit integers in image processing and storage the original densities are multiplied by a factor of 1000.

The best renditions of people are obtained the reproduced images contain no visible image structure artifacts, e.g., noise. Therefore it is advantageous but not required to apply a noise reduction algorithm. An example of a suitable algorithm is disclosed in European Patent Publication No. EP1093088 B1, filed by Gindele, entitled "A region growing based noise reduction method for digital images". This algorithm uses a sparse local neighborhood in form of a snowflake in order to apply noise reduction only to regions that do not contain edges, thus sufficiently reducing noise while retaining good edge sharpness. Noise reduction algorithms work based on thresholds and they normally need an estimate of the image noise as a function of digital code values. Those skilled in the art will recognize that such tables may be generated in advance by characterizing the noise of a certain film/scanner combination. Noise tables may also be generated by automatic noise estimation using the actual images of a photofinishing order, as disclosed by European Patent Publication No. EP1205878 A2, filed by Gindele and Serrano, entitled "Estimating noise for a digital image utilizing updated statistics".

As a next step, a scene balance algorithm 130 is applied in order to map a predetermined visual scene density to a predetermined digital code value. The algorithms are commonly known as "white-balance," "color-constancy" or "scene-balance" algorithms. These algorithms can work on a single image, several images, or an entire set of images. An example of a suitable scene balance algorithm is described by E. Goll et al., "Modern Exposure Determination for Customizing Photofinishing Printer Response", Journal of Applied Photographic Engineering, 2, 93 (1979). Further improvements in scene-balance algorithms might include mixed illuminant detection and subject detection.

For a perfect neutral balance, for example, the 20% reflector may be mapped to a code value of 1644. However, it is understood by those skilled in the art that all scene balance algorithms have some distribution of errors and that the above requirement is never perfectly met. Averaged over a large number of scenes the algorithm is able to meet the above aim. It may be the case that the above specification produces on average good skin tone renditions in one geographic region, but that a different skin tone rendition is preferred in another geographic region. The appropriate color and density balance offset to produce good skin tone renditions in the second region may be supplied to the scene balance algorithm 130 via the regional parameter set 1 (reference number 132), so that the balance of the overall population of images is shifted by the specified amount.

The aims for such manipulations based on the optimum skin tone reproduction for a given geographic regions can be obtained in controlled psychophysical studies of color and tone attributes such as those described in Chapter 20 of the Handbook of Image Quality (B. W. Keelan, "Handbook of Image Quality", Marcel Dekker, 2002).

It is often the case that the preferred color and density balance of scenes containing people is different from scenic images without people. For example, a lighter balance may be preferred for scenes containing people, but this may make scenic images appear too washed out. This can be addressed by including a skin detection algorithm 134 in the image processing sequence in order to apply different balances to both types of scenes. A suitable algorithm is disclosed in U.S. Published Patent Application No. US2003/0035578 A1, which is hereby incorporated by reference. This algorithm uses an aim density for the preferred rendition of skin tones, which again may be customized by geographic region. The regional parameter 2 (reference number 138) determines the magnitude of the brightness adjustment performed by the algorithm 136. As an alternative, this and like parameters can be set manually by an operator based upon trial and error.

The image processing sequence may optionally include a scene-dependent tone enhancement algorithm, which enhances highlight and shadow detail of scenes with dynamic range (exposure ratio of the lightest and darkest parts of the original scene) too large to be accommodated by the output medium 144. Suitable algorithms are disclosed in U.S. Pat. No. 6,594,388 B1, to Gindele et al., entitled "Color image reproduction of scenes with preferential color mapping and scene-dependent tone scaling". These algorithms, specifically those that analyze and modify the tone scale and noise levels in the image, may be configured for optimal regional skin reproduction performance with the tone reproduction curves described in this invention. The configuration of these algorithms could be set as defaults on system start-up or could be modified by the operator from the appropriate user interface screens as overall defaults, or on an order-by-order or image-by-image basis selected during preview and editing operations. Finally the rendering transform maps the digital representation of the scene enhanced by modules 128, 130, 136, 140 to code values, which are suitable for the output module.

The regional customization parameters 132 and 138 may be preloaded from a database for a given geographic region or country before the apparatus is shipped to the customer. The customer may fine tune this setting from a user interface 112 of the digital mini lab 100.

Figure 11:
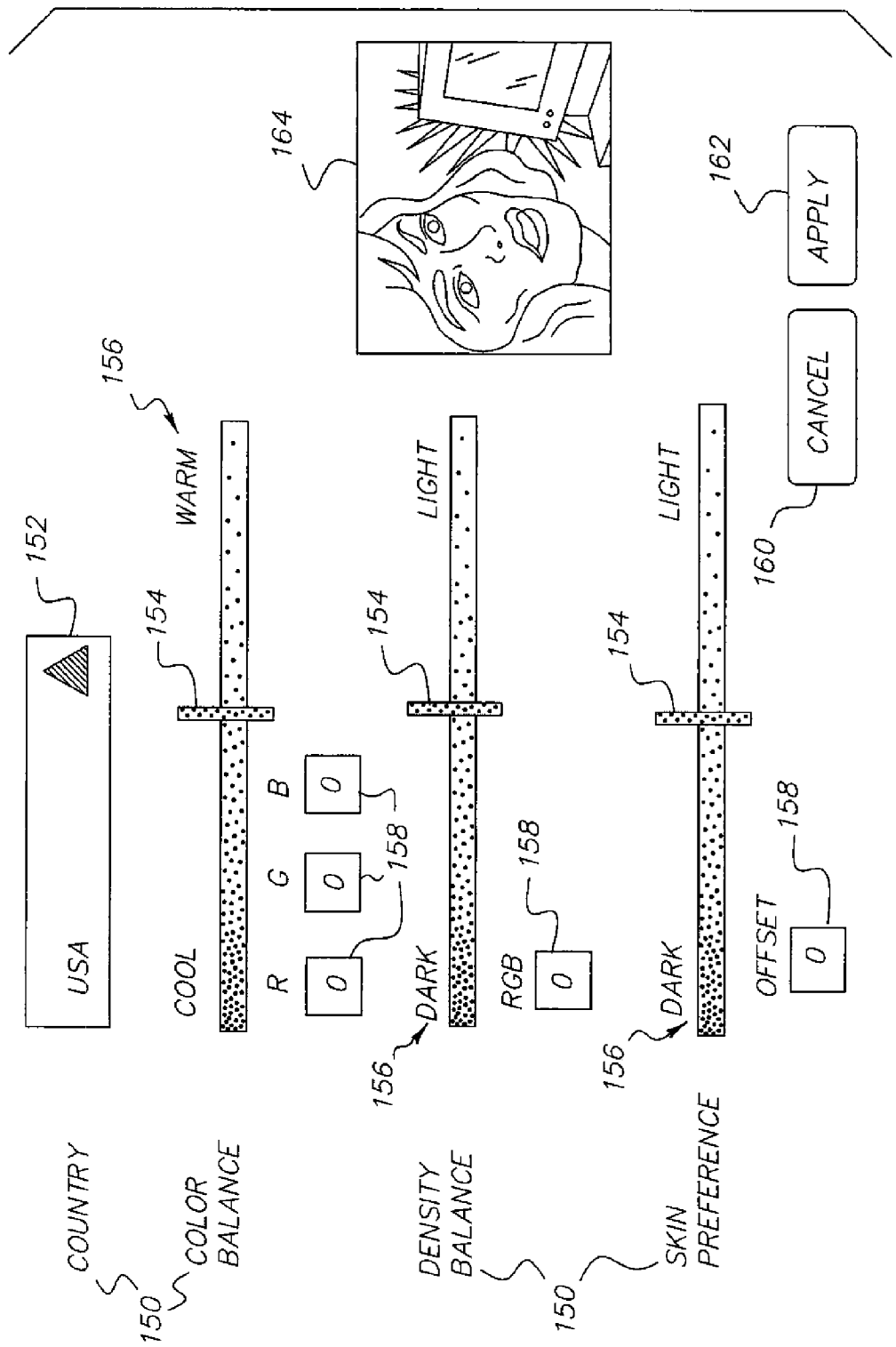
FIG. 11 is a diagrammatical view of a user interface of an embodiment of the system.

An example of a suitable user interface is shown in FIG. 11. The interface includes verbal descriptions 150 of the categories that can be modified, e.g., country, color balance. Any text in FIG. 11 may be displayed in different languages. Optionally the display screen may include one or more reference images 164 that show the user the effect of the changes in real time. The user can select from a number of available countries and regions using the menu 152. This loads the recommended settings for color and density balance and skin preference, showing the corresponding positions of the sliders 154 relative to scales 156 and shifts in numeric form 158. The user may then either enter new numerical values 158 or move the sliders 154 to change the preferred shifts. The user may save the new settings using radio button 162 or return to the previous settings by pressing the "Cancel" button 160. The new settings are communicated to the digital image processor 110.

Figure 12:
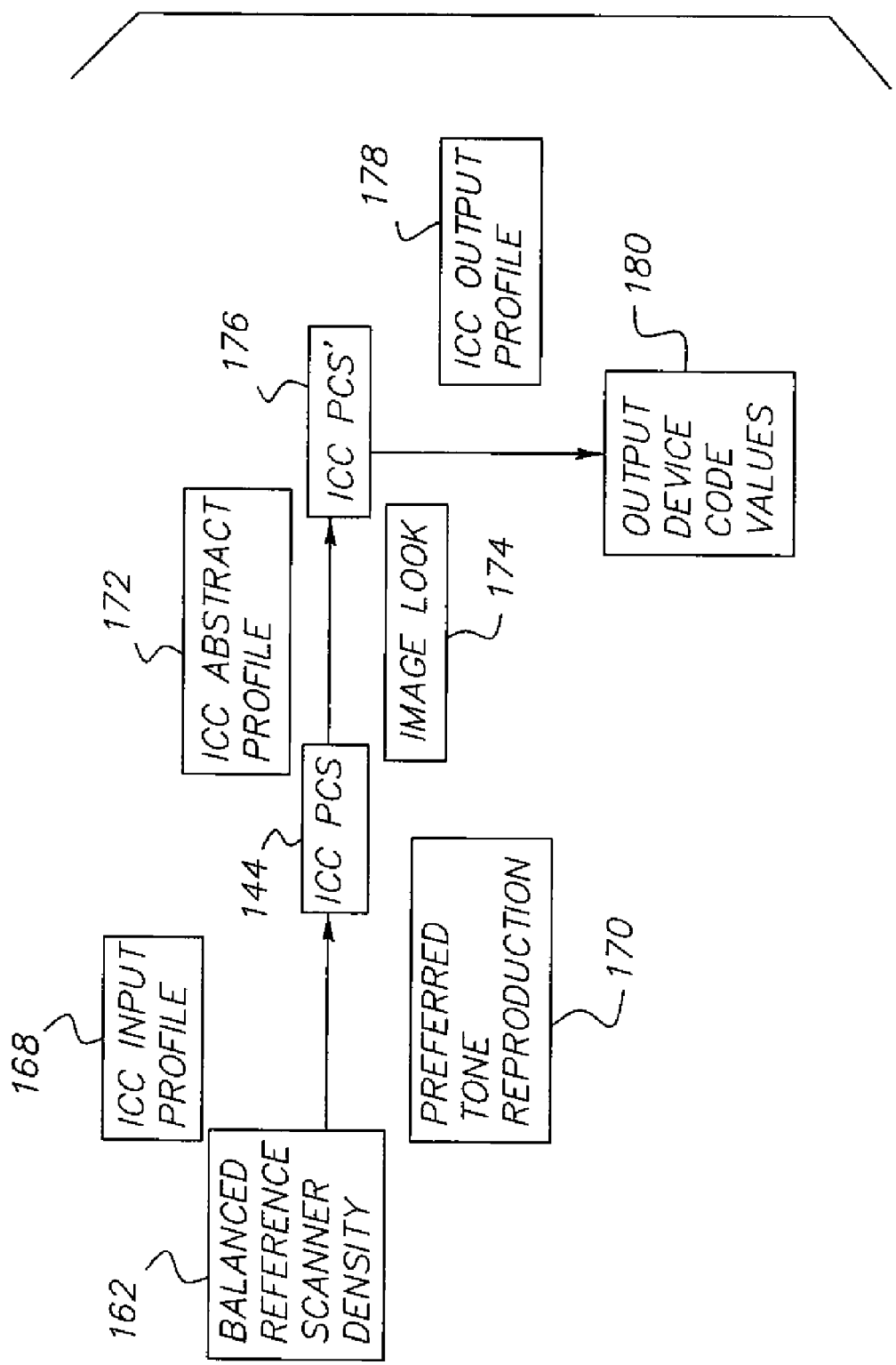
FIG. 12 is a diagrammatical view of additional features of the transform of FIG. 9.

FIGS. 8 and 12 illustrate implementing of a particular geolocalizable tonescale. For the construction of the tonescale 142, suitable test targets 102 are exposed, chemically processed and scanned by scanner 104. The conversion 126 to reference scanner density 124 is performed, and the target is custom balanced such that the 20% gray reflector maps to equal code values of 1644 in the balanced reference space 166.

The tonal properties of the aim reproduction 89 in FIG. 8 are represented by the geolocalizable tonescale, in CIE 1976 L* values or visual densities of the reproduced image 96 in relation to the scene 82. Those skilled in the art will recognize that the aims 89 may be converted to a standard RGB space, e.g., ISO Standard Status A densities, if the spectral reflectances of the image dyes and the reflective base material are known. It is then straightforward to construct a one-dimensional lookup table (1D LUT) between the balanced reference scanner densities 166 and the ISO Standard Status A densities. If the chosen dye set represents a "real" photographic paper, e.g., KODAK EDGE Generations Paper, this 1D LUT can represent the ISO Standard Status A versus printing density aim of a new photographic paper for optical printing according to the invention.

In the digital implementation other suitable practical or hypothetical dye sets may be chosen. Examples of suitable dyes were given by Hunt (p. 135-148). Based on the known spectral reflectances of the dyes and the base material, it is straightforward to calculate CIE XYZ values for CIE Standard Illuminant D50 and to convert those values to ICC PCS 144 according to ICC specifications (Specification ICC.1: 2003-09, File Format for Color Profiles (Version 4.1.0)). Thus, in the first preferred embodiment, the tone reproduction curve according to the invention is implemented as ICC input profile 168 between balanced reference scanner densities 166 and ICC PCS 144. This transformation may include other mathematical operations, e.g., matrices or polynomials to simulate the inter-image effect of the photographic paper (Giorgianni and Madden), or 3D LUTs to achieve the overall desired color reproduction.

Optionally, the image processing sequence may include abstract profiles 176, Which implement different image looks in PCS, e.g., different flavors of black-and white reproduction such as sepia, or image saturation levels. Examples of such looks are disclosed in U.S. Published Patent Application No. US2001/0053247 A1, filed by Sowinski et al., entitled "Plurality of picture appearance choices from a color photographic recording material intended for scanning".

The modified PCS values 176 are mapped to device code values 180, referring to the particular device and media combination, using an ICC output profile 172. This step ensures that the desired visual reproduction according to the invention, encoded in PCS (144, 176), is reproduced in the final print. Device characterization and calibration are preformed by procedures known to those of skill in the art, such as those outlined by Giorgianni and Madden (Chapter 13). The transformation 92 in FIG. 8 includes all image processing steps between elements 122 and 180 according to FIGS. 10 and 12, although any scene-specific processing (130, 134, 136, 140) must be disabled in the design and verification of the overall system tonescale according to invention.

EXAMPLE 2

Figure 13:
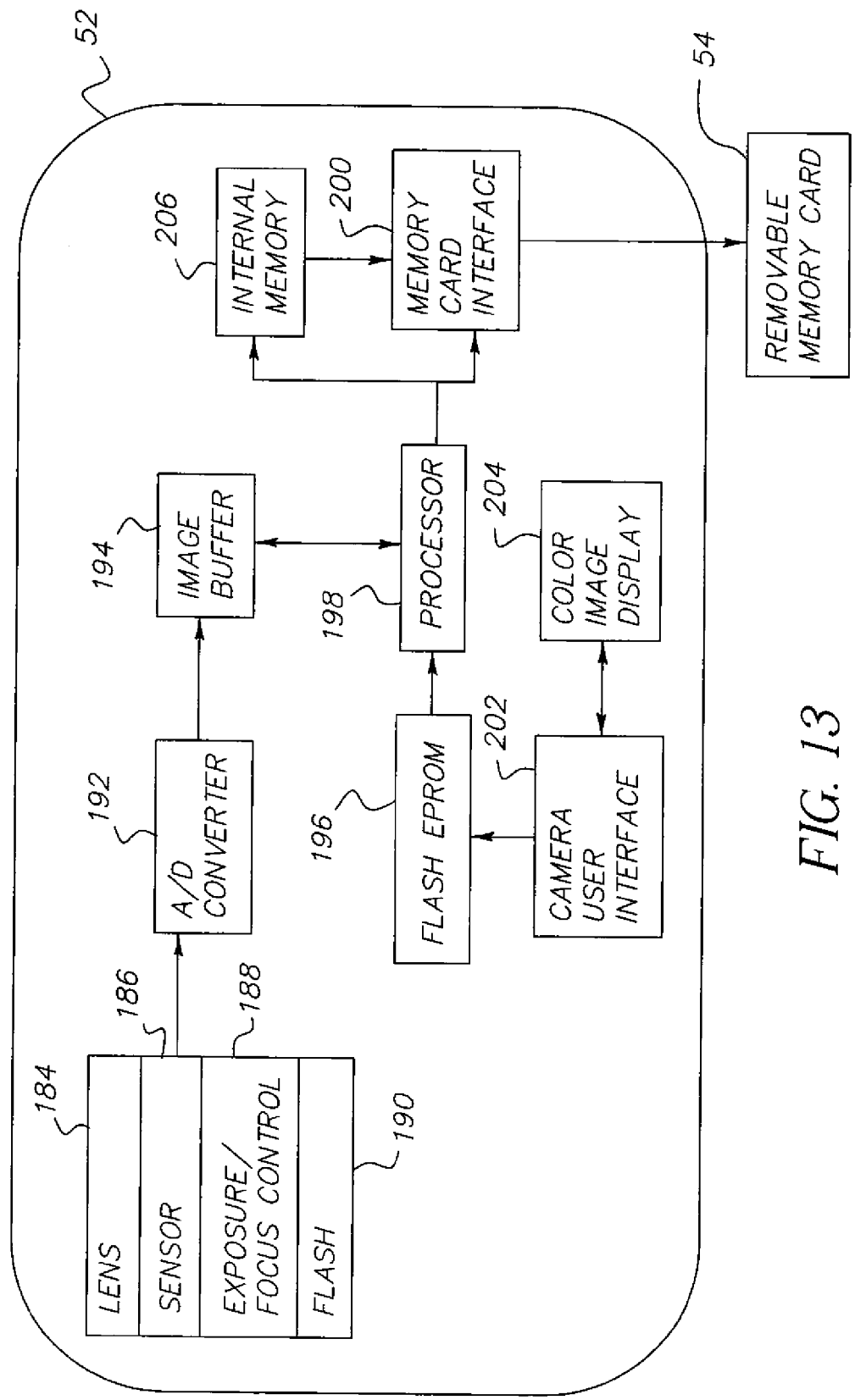
FIG. 13 is a diagrammatical view of another embodiment of the system of the invention, in the form of a digital camera.

In another embodiment, the image is captured using a digital camera, e.g., Kodak DX 6490, and printed on a Kodak Picture Maker® kiosk on thermal paper. For smooth skin tone reproduction on a 4×6 inch print without visible digital artifacts the sensor must at least have a resolution of 2 Megapixels, preferably above 3 Megapixels. Higher sensor resolutions are required for larger size prints. FIG. 13 describes the elements of the digital camera 52 which are necessary for practicing the invention. The digital camera 52 includes an electronic display as optical viewfinder for composing a scene (not shown), a 10:1 zoom lens 184 controlled by a zoom lens driver (not shown) which is in turn controlled by a processor 198. The zoom lens 184 includes an adjustable aperture and shutter (labeled as exposure and focus control 188) for focusing light from a scene onto an image sensor 188. The camera may also include a flash unit 190.

The image sensor 188 is in this case a single-chip color charge-coupled device (CCD), using the well-known Bayer color filter pattern, but may also be a CMOS sensor or any other suitable sensor. When the user depresses a shutter button (not shown), the image is captured using the image sensor 188. The analog output signal from the image sensor 188 is converted to digital data by an analog-to-digital (A/D) converter 192. The digital data passed to an image buffer 194 for temporary storage and processed by a processor 198 controlled by firmware stored in a reprogrammable memory 196, such as a Flash EPROM. The regional preference configuration that would include the tonescale characteristics described in the invention can be applied at this stage in the camera. The processed digital image file is provided to a memory card interface 200 which stores the digital image file on the removable memory card 54, in this case a SmartMedia™ card (a special form of SSFDC card compatible with the PMCIA Standard and trademarked to Toshiba) or internal memory 206.

The processor 198 performs color interpolation followed by color and tone correction, in order to produce rendered sRGB image data. The tone reproduction curves according to the present invention are implemented as part of this processing sequence. Other image enhancement algorithms such as noise reduction, sharpening and adaptive tone scale modification can also be applied at this stage within the camera and may be specifically configured to provide optimum regional skin reproduction in conjunction with the tone scale of the present invention.

Figure 14:
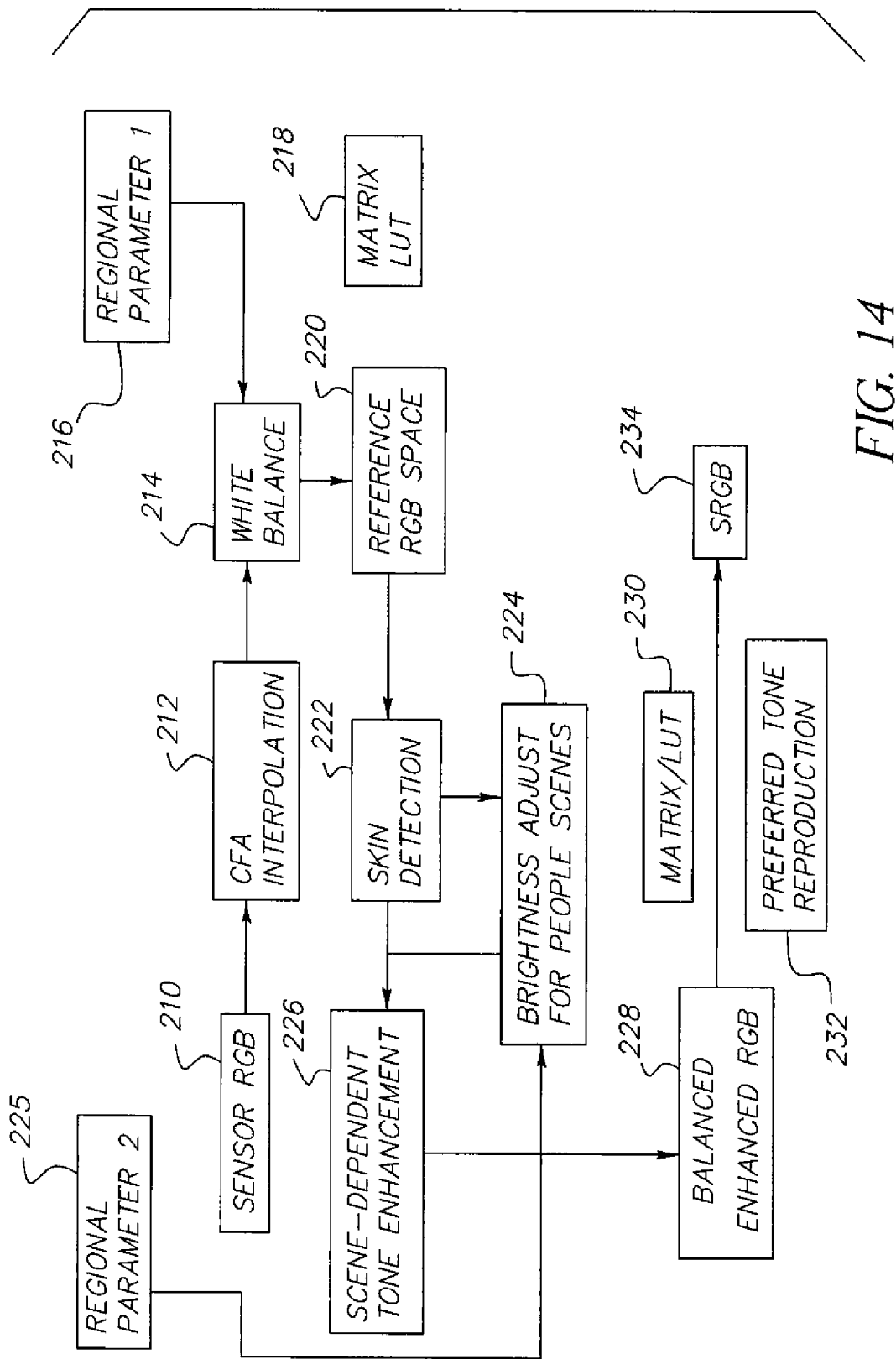
FIG. 14 is a diagrammatical view of the operation of the camera of FIG. 13.

This processing is shown in FIG. 14. The processor 198 can include internal buffer memory to store a portion of the image, or to store one or more images. Alternatively, the processor 198 can use a separate external memory (not shown), such as DRAM memory. The rendered sRGB image data is then JPEG compressed and stored as a JPEG image file on the removable memory card 54. For smooth appearance of human faces the JPEG compression ratio must be such that the file size for a 4×6 inch print does not fall below 200 kB. Lower compression ratios are required to produce larger prints, which are free of digital artifacts. The processor 198 also provides a lower resolution or "thumbnail" size image data to a color image display 204, such as a color liquid crystal display (LCD), which displays the captured image for the user to review. A camera user interface 202 including a series of user buttons and a capture/review mode switch is used to control the digital camera 52. This GUI is controlled by the user interface portion of the firmware stored in the Flash EPROM 196. This interface can be used to customize settings and image processing parameters of the camera, as will be discussed later in connection with FIGS. 15-16c. Any changes to camera settings may be loaded into the reprogrammable Flash EPROM 196. The process of storing firmware code in an EPROM and of erasing firmware code from an EPROM is well known in the art, and need not be discussed in detail.

After a series of images has been taken by the digital camera 52 and stored on the removable memory card 54 the memory card is inserted into Kodak Picture Maker® kiosk 64 and printed on Kodak EKTATHERM thermal paper XTRALIFE™ lamination 66. This printer and media combination was characterized according to standard procedures such that the printer is able to reproduce the tonal information encoded in sRGB. The user may select any additional enhancement operations that are normally offered by a kiosk, e.g., zoom and crop operations, redeye removal and additional sharpening and color and tone adjustment if desired.

FIG. 14 shows the steps carried out in the processor as far as they are relevant for this invention. Other steps, such as noise reduction, sharpening and redeye removal may also be included. As a first step, the fully populated R, G and B planes are generated by CFA interpolation 212 from the sparse set of ROB code values captured by the sensor 210. Next, a white balance algorithm 214 is applied to normalize the RGB values such that a 100% white diffuser has a predetermined set of equal RGB code values. An example of a suitable algorithm was disclosed by Gindele et al. (U.S. patent application Ser. No. 2003/0280650A1 "Method for Automatic White Balance of Digital Images"). As discussed in connection with the scene balance algorithm 130 in FIG. 10, this white balance algorithm 214 will have some distribution of errors. Averaged over a large number of scenes the algorithm is able to meet the predetermined aim. It may be the case that the this specification produces on average good skin tone renditions in one geographic region, but that a different skin tone rendition is preferred in another geographic region. The appropriate color and density balance offset to produce good skin tone renditions in the second region may be supplied to the white balance algorithm 214 via the regional parameter set 1 (reference number 216), so that the balance of the overall population of images is shifted by the specified amount.

At this point it is advantageous to convert the white balanced camera RGB code values to a set of RGB values with standard or commonly used primaries, for example those defined in Recommendation ITU-R BT.709, which were also selected for the sRGB color space, or the primaries defined by Spaulding et. al. (K. E. Spaulding, G. J. Woolfe, and E. J. Giorgianni, "Reference Input/Output Medium Metric RGB Color Encodings (RIMM/ROMM RGB)", Proc. PICS 2000, pp. 155-163 (2000)). The relationship between scene luminance and RGB code values in the reference RGB space 220 may be linear, logarithmic or follow any other predefined functional relationship. For computational efficiency the transformation from balanced camera RGB values is accomplished by a matrix and 1D LUT 218.

It is often the case that the preferred color and density balance of scenes containing people is different from scenic images without people. For example, a lighter balance may be preferred for scenes containing people, but this may make scenic images appear too washed out. This can be addressed by including a skin detection algorithm 222 in the image processing sequence in order to apply different balances to both types of scenes. A suitable algorithm is disclosed in Dupin. This algorithm uses an aim density for the preferred rendition of skin tones, which again may be customized by geographic region. The regional parameter 2 (reference number 225) determines the magnitude of the brightness adjustment performed by the algorithm 224.

Other image enhancement algorithms adaptive tone scale modification 226 can also be applied at this stage within the camera and may be specifically configured to provide optimum regional skin reproduction in conjunction with the tone scale of the present invention. Such algorithms enhance highlight and shadow detail of scenes with a dynamic range too large to be accommodated by the output color encoding in sRGB 234. Suitable algorithms are disclosed in U.S. Pat. No. 6,285,798 B1, to Lee, entitled "Automatic tone adjustment by contrast gain-control on edges".

Those skilled in the art recognize that the aim CIELAB values of the reproduction can be converted to PCS or sRGB using the appropriate definition of those color encodings. Thus it is straightforward to construct a 1D LUT between the RGB code values of balanced neutral colors in the reference RGB space 230 and the corresponding sRGB code values representing the tone reproduction 232 according to the invention. If the primaries of the reference RGB space 220 differ from those of the sRGB encoding, an additional matrix may be included. The preferred conversion method is therefore a matrix/1D LUT combination 234.

It is also possible to follow the transform the balanced reference RGB values 230 to sRGB using the concatenation of ICC profiles shown in FIG. 12. In the case of the digital camera part 162 are replaced with balanced reference RGB code values 230, and output device code values 180 represent sRGB code values 234.

The regional customization parameters 216 and 256 can be preloaded from a database to Flash EPROM 196 for a given geographic region or country in manufacturing if the destination of the camera is known. Alternatively, the camera may be shipped with standard settings, but several alternative settings are stored in the internal memory 206 of the camera or on Flash EPROM 196. The user can alter the settings from the camera user interface 202. The high level menu shown in FIG. 15 can be part of a set of menus that the user may display on the camera color display 204 to customize the function of the camera 52. Such menus are common in digital cameras, and they allow the user to customize many functions such time and date stamps, zone weighting of autofocus and the exposure control 188 and many others. This first level of the menu 240 contains a title 242, graphic icons 244 and verbal descriptions 246 of the categories that can be modified, e.g., country, color balance, skin preference. The selected category is shown in a different color or with other highlighting 248, and at selection the submenus shown 250, 258 and 260 in FIGS. 16 a-c appear. The submenus 250, 258 and 260 contain a title 252 and verbal descriptions 254 of the available settings. More settings than shown on the display 204 may be available and can be accessed by scrolling down the menu. The selected item is denoted by a check mark 256. Scrolling to the left selects this item and takes the user to the previous high level menu 240. The new settings are loaded to Flash EPROM 196, which is accessed by the processor 198, when new captured images are processed.

Figure 15:
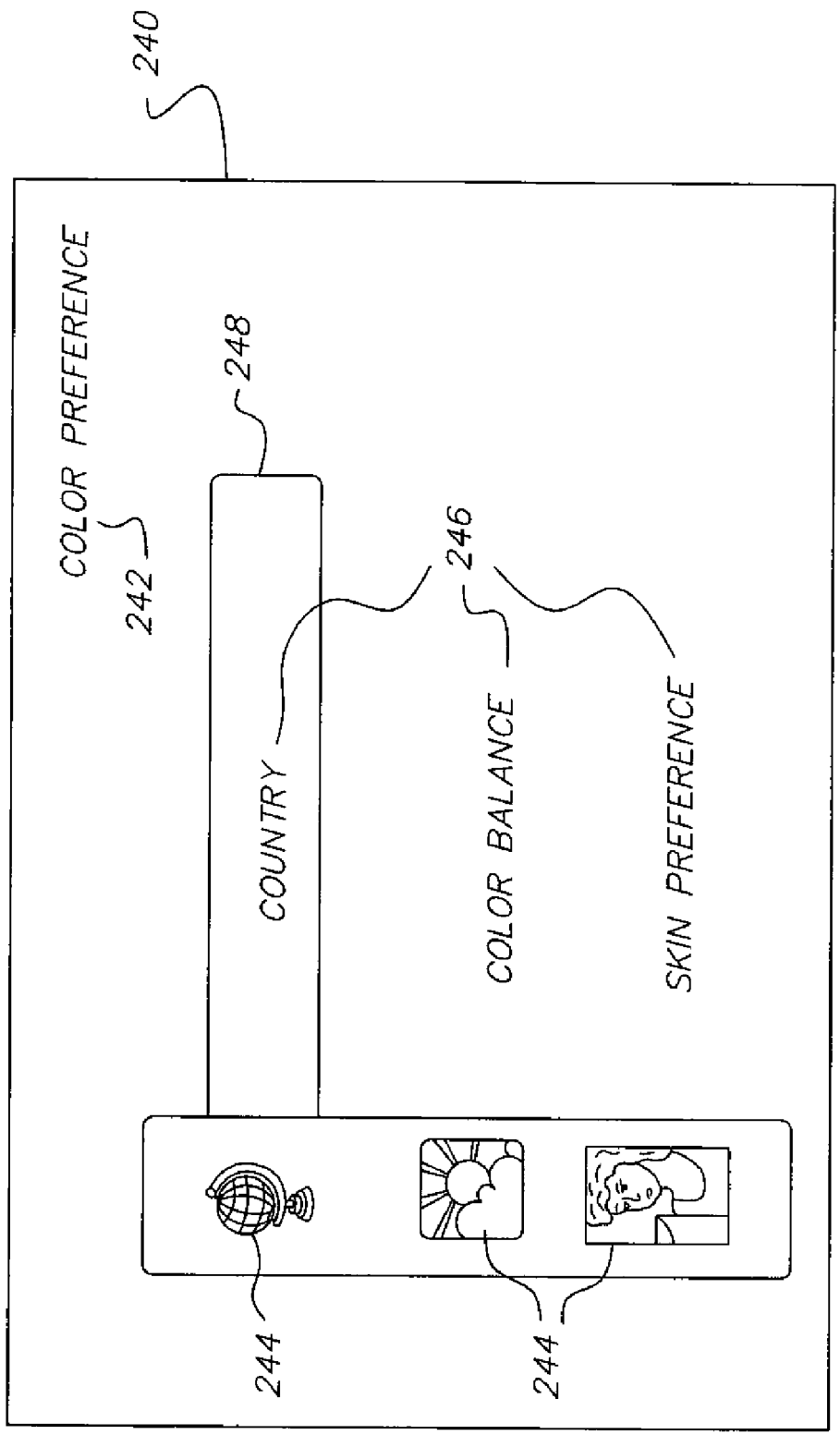
FIG. 15-16c are diagrammatical views of menus and submenus of the camera of FIG. 13.
Figure 16A:
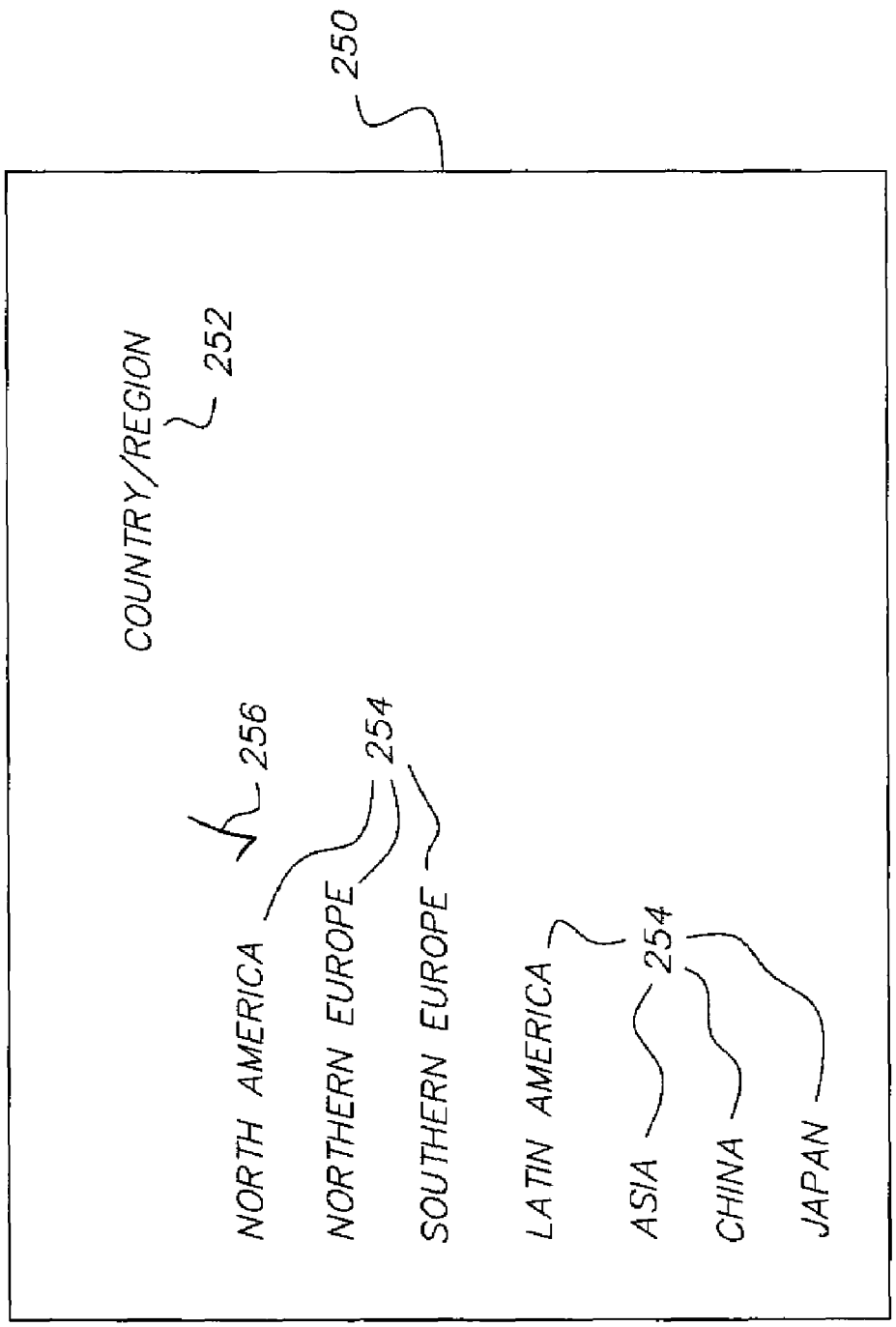
Figure 16B:
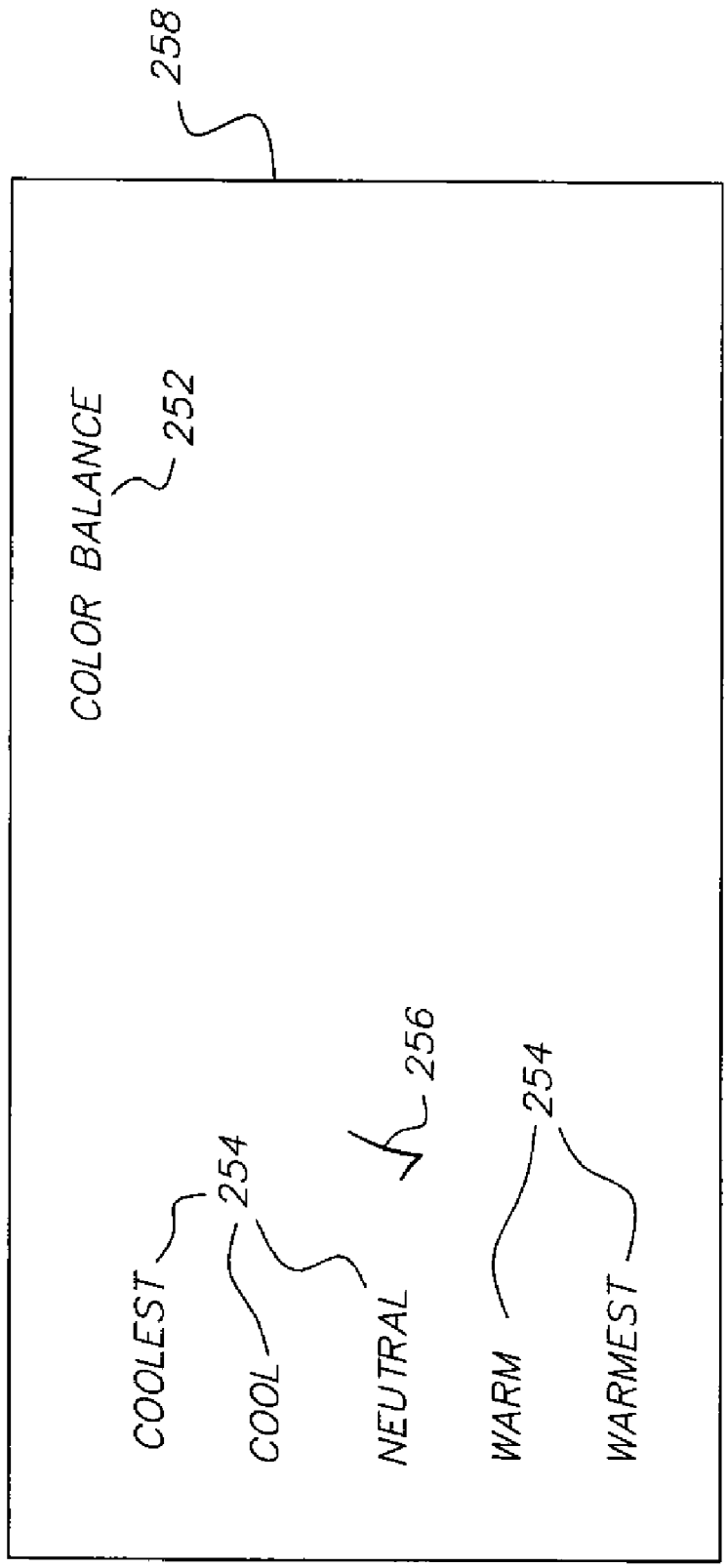
Figure 16C:
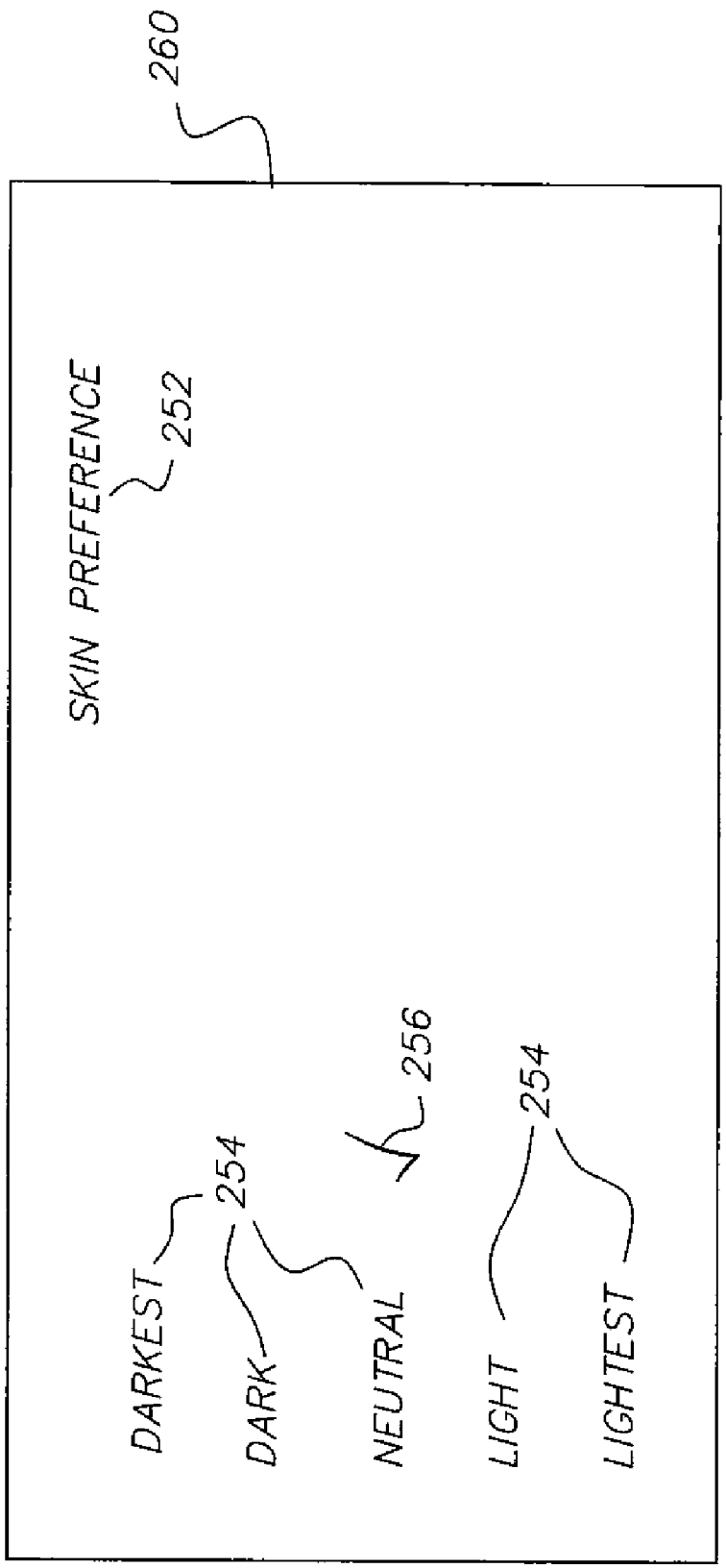

Any text in FIGS. 15-16c can be displayed in different languages. Alternatively, a digital camera can lack regional customization and the sRGB images can be saved to the removable memory card 54 without any regional modifications. In this case, a special software package residing on the host computer 70 can be provided that recognizes the camera model and then provides for regional customization, as shown in FIGS. 15, 16*a-c*, and performs additional processing to produce sRGB images 234 according to the selected preferences. This can be done when the images are imported from the removable memory 54 to the hard disk of the computer 70. The user can select from a number of available countries and regions using the menu 152. This loads the recommended settings for color and density balance and skin preference, showing the corresponding positions of the sliders 154 and shifts in numeric form 158. The user may then either enter new numerical values 158 or move the sliders 154 to change the preferred shifts. The user may save the new settings using radio button 162 or return to the previous settings by pressing the "Cancel" button 160. The new settings are communicated to the digital image processor 110. An example of a suitable package is the Kodak EasyShare software distributed with all digital cameras made by Eastman Kodak Company.

The invention has been described in detail with particular reference to certain preferred embodiments thereof, but it will be understood that variations and modifications can be effected within the spirit and scope of the invention.

The invention claimed is:

1. A method implemented at least in part by a microprocessor-based unit, the method for providing image-processing parameters for an image, the method comprising the steps of:
   acquiring information about a device, the device being an image-acquisition device that acquired or is acquiring the image or an output device with which the image is to be reproduced;
   providing a regional image processing parameter based at least upon the information, the regional image processing parameter relating to geographic location; and
   storing the regional image processing parameter in a computer-readable storage medium.

2. The method of claim 1, wherein the device is an image-acquisition device and the information about the device is a device model.

3. The method of claim 2, wherein the device is a camera and the information about the device is a camera model.

4. The method of claim 1, wherein the regional image processing parameter relates to reproduction of skin tones.

5. A computer-readable storage medium storing instructions configured to cause a microprocessor-based unit to implement a method for providing image-processing parameters for an image, wherein the instructions comprise:
   instructions for acquiring information about a device, the device being an image-acquisition device that acquired or is acquiring the image or an output device with which the image is to be reproduced;
   instructions for providing a regional image processing parameter based at least upon the information, the regional image processing parameter relating to geographic location; and
   instructions for storing the regional image processing parameter in a computer-readable storage medium.

6. The computer-readable storage medium of claim 5, wherein the device is an image-acquisition device and the information about the device is a device model.

7. The computer-readable storage medium of claim 6, wherein the device is a camera and the information about the device is a camera model.

8. The computer-readable storage medium of claim 5, wherein the regional image processing parameter relates to reproduction of skin tones.

9. A system comprising:
   a microprocessor-based unit; and
   a computer readable storage medium communicatively connected to the microprocessor-based unit and storing instructions configured to cause the data processing system to implement a method for providing image-processing parameters for an image, wherein the instructions comprise:
   instructions for acquiring information about a device, the device being an image-acquisition device that acquired or is acquiring the image or an output device with which the image is to be reproduced;
   instructions for providing a regional image processing parameter based at least upon the information, the regional image processing parameter relating to geographic location; and
   instructions for storing the regional image processing parameter in a computer-readable storage medium.

10. The system of claim 9, wherein the device is an image-acquisition device and the information about the device is a device model.

11. The system of claim 10, wherein the device is a camera and the information about the device is a camera model.

12. The system of claim 9, wherein the regional image processing parameter relates to reproduction of skin tones.

* * * * *